(12) United States Patent
Ishida et al.

(10) Patent No.: US 11,820,107 B2
(45) Date of Patent: Nov. 21, 2023

(54) INTERLAYER FILM FOR LAMINATED GLASS, ROLL, AND LAMINATED GLASS

(71) Applicant: SEKISUI CHEMICAL CO., LTD., Osaka (JP)

(72) Inventors: Jun Ishida, Shiga (JP); Hiromitsu Nishino, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 17/617,121

(22) PCT Filed: Jun. 10, 2020

(86) PCT No.: PCT/JP2020/022879
§ 371 (c)(1),
(2) Date: Dec. 7, 2021

(87) PCT Pub. No.: WO2020/250939
PCT Pub. Date: Dec. 17, 2020

(65) Prior Publication Data
US 2022/0227108 A1   Jul. 21, 2022

(30) Foreign Application Priority Data
Jun. 14, 2019 (JP) ................ 2019-111490

(51) Int. Cl.
*B32B 17/10* (2006.01)
*B32B 3/26* (2006.01)
*B32B 27/30* (2006.01)

(52) U.S. Cl.
CPC ........ *B32B 17/10568* (2013.01); *B32B 3/263* (2013.01); *B32B 17/10036* (2013.01);
(Continued)

(58) Field of Classification Search
CPC .............. B32B 17/10568; B32B 3/263; B32B 17/10036; B32B 17/10761; B32B 27/30;
(Continued)

(56) References Cited

U.S. PATENT DOCUMENTS

| 4,226,818 | A | * | 10/1980 | Brower | .................. B29C 53/32 |
| | | | | | 264/348 |
| 2010/0314900 | A1 | | 12/2010 | Labrot et al. | |

(Continued)

FOREIGN PATENT DOCUMENTS

| CN | 107618234 | 1/2018 |
| JP | 4-502525 | 5/1992 |

(Continued)

OTHER PUBLICATIONS

International Search Report (ISR) dated Sep. 1, 2020 in International (PCT) Application No. PCT/JP2020/022879.
(Continued)

*Primary Examiner* — Megha M Gaitonde
(74) *Attorney, Agent, or Firm* — Wenderoth, Lind & Ponack, L.L.P.

(57) ABSTRACT

Provided is an interlayer film for laminated glass with which transmitted double images in the laminated glass can be suppressed. An interlayer film for laminated glass according to the present invention has one end and the other end being at the opposite side of the one end, and the other end has a thickness larger than a thickness of the one end, and when an inclination of approximate line A and a maximum value of absolute values of deviation in partial wedge angle are calculated according to determination of a specific formula of approximate line A and calculation of deviation in partial wedge angle, the inclination of approximate line A is −0.05
(Continued)

mrad/m or less in at least one section A, and the maximum value of absolute values of deviation in partial wedge angle is 0.2 mrad or less.

10 Claims, 7 Drawing Sheets

(52) U.S. Cl.
CPC ........ *B32B 17/10761* (2013.01); *B32B 27/30* (2013.01); *B32B 2250/03* (2013.01); *B32B 2250/40* (2013.01); *B32B 2315/08* (2013.01); *B32B 2329/06* (2013.01); *B32B 2605/006* (2013.01); *B32B 2605/08* (2013.01)

(58) Field of Classification Search
CPC ............ B32B 2250/03; B32B 2250/40; B32B 2315/08; B32B 2329/06; B32B 2605/006; B32B 2605/08; B32B 2307/102; B32B 17/10587; B32B 17/1055; B32B 17/10605; B32B 17/10779; B32B 27/18; B32B 27/22; B32B 27/306; B32B 27/36; B32B 2307/40; C08J 5/18; C08J 2329/14; G02B 27/0101; G02B 2027/012; G02B 27/01; B60J 1/008; B60J 1/001; B60J 1/02; B60K 35/00
USPC .......................... 428/156, 172, 212, 213, 214
See application file for complete search history.

(56) References Cited

U.S. PATENT DOCUMENTS

| | | |
|---|---|---|
| 2016/0168353 A1* | 6/2016 | Spangler ........... B32B 17/10568 428/156 |
| 2016/0291324 A1 | 10/2016 | Arndt et al. |
| 2018/0017789 A1 | 1/2018 | Aoki et al. |
| 2018/0157033 A1 | 6/2018 | Arndt et al. |
| 2018/0264786 A1 | 9/2018 | Oota et al. |
| 2018/0297332 A1 | 10/2018 | Nishino et al. |
| 2020/0016871 A1 | 1/2020 | Ishida et al. |
| 2020/0064626 A1 | 2/2020 | Sadakane et al. |

FOREIGN PATENT DOCUMENTS

| | | |
|---|---|---|
| JP | 2011-505330 | 2/2011 |
| JP | 2017-502125 | 1/2017 |
| JP | 2017-178785 | 10/2017 |
| WO | 91/06031 | 5/1991 |
| WO | 2017/057497 | 4/2017 |
| WO | 2018/181418 | 10/2018 |
| WO | 2018/216574 | 11/2018 |

OTHER PUBLICATIONS

International Preliminary Report on Patentability and Written Opinion of the International Searching Authority dated Dec. 14, 2021 in International (PCT) Application No. PCT/JP2020/022879.
Extended European Search Report dated Jun. 9, 2023 in corresponding European Patent Application No. 20823302.3.

* cited by examiner

[FIG. 1.]
(a)
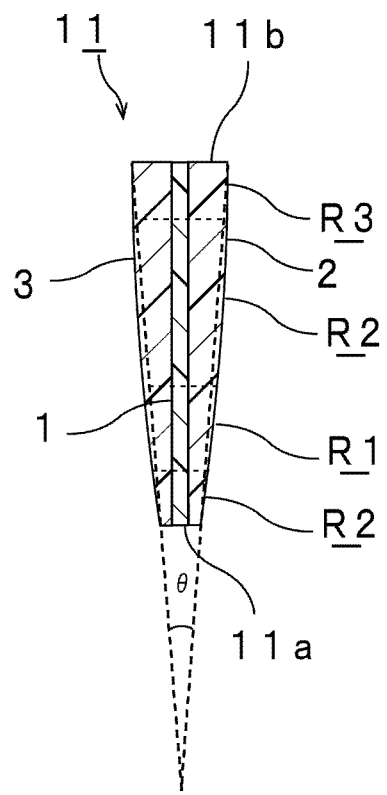
(b)
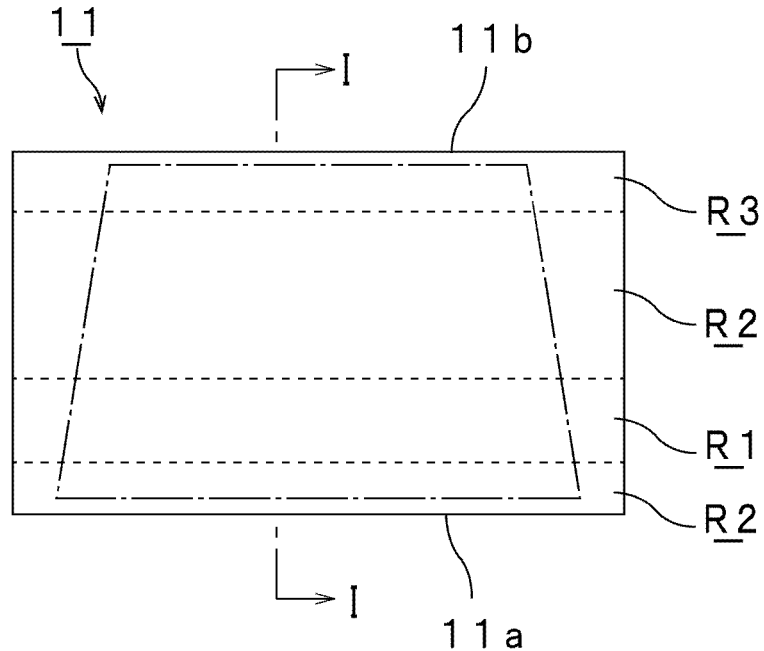

[FIG. 2.]
(a)
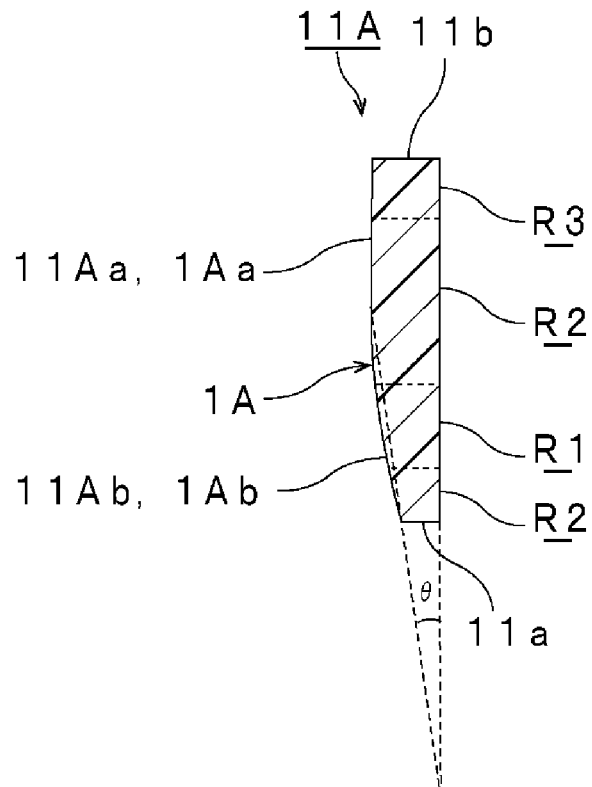
(b)
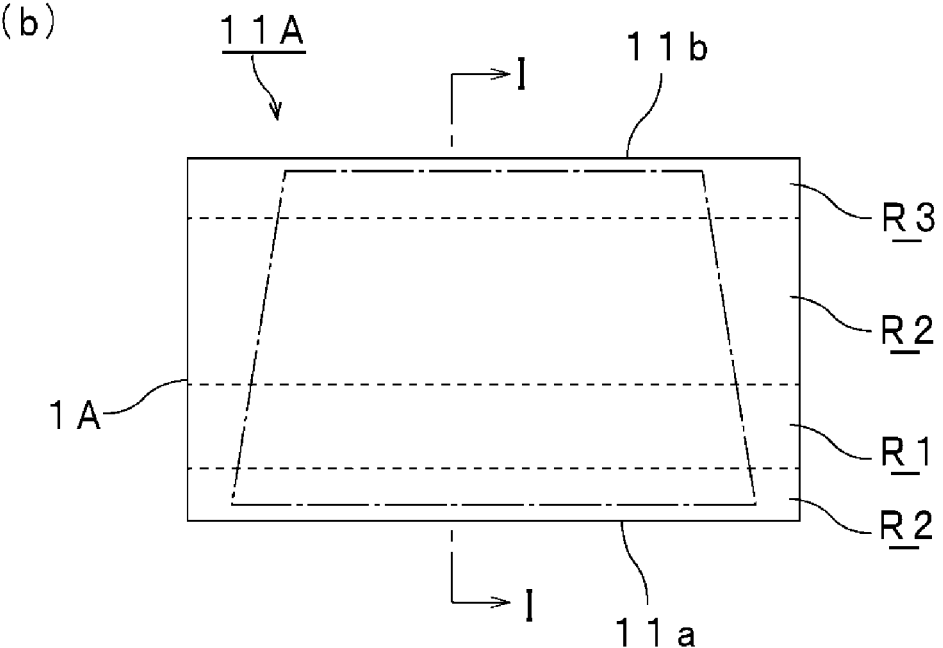

[FIG. 3.]
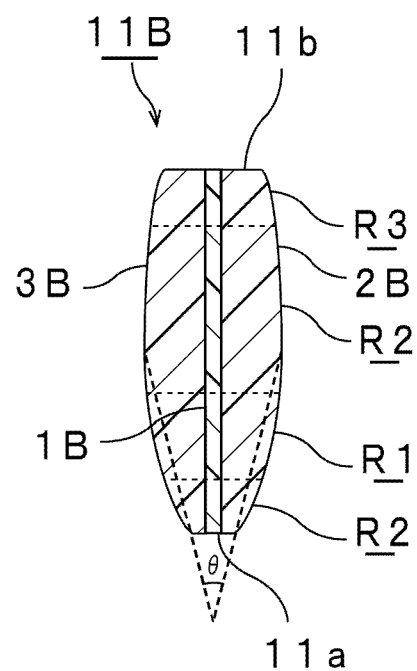

[FIG. 4.]
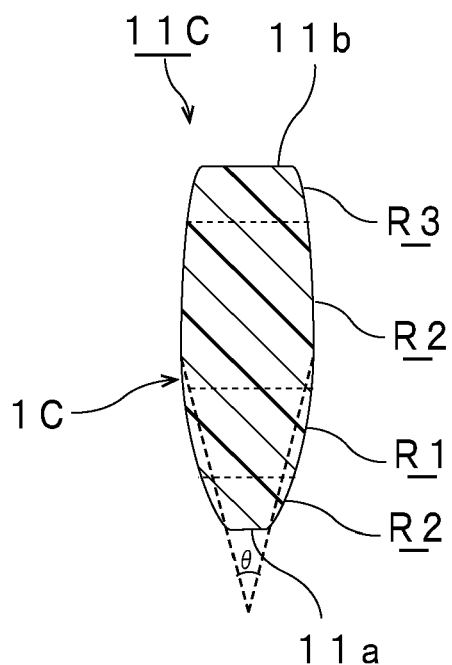

[FIG. 5.]
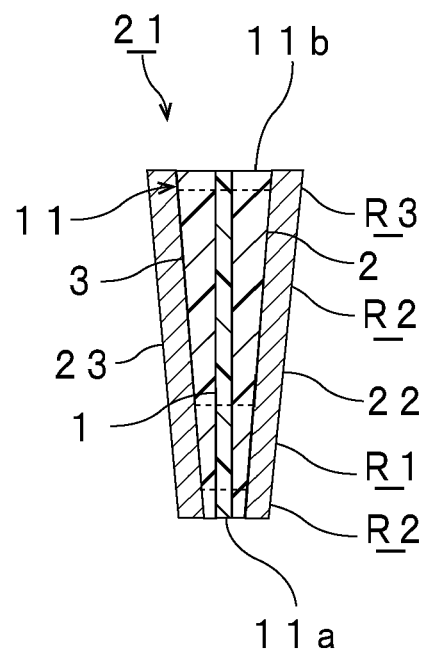
[FIG. 6.]
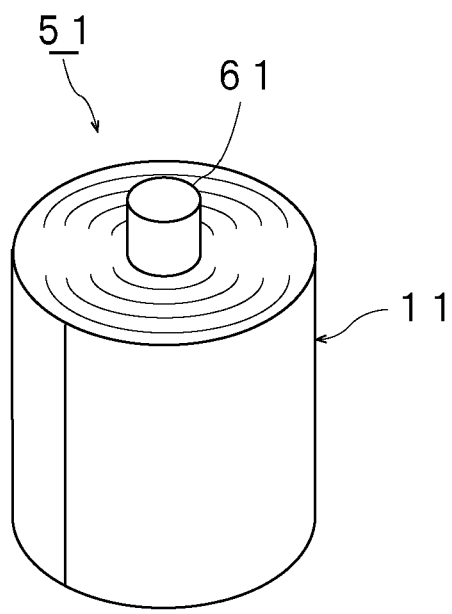

[FIG. 7.]
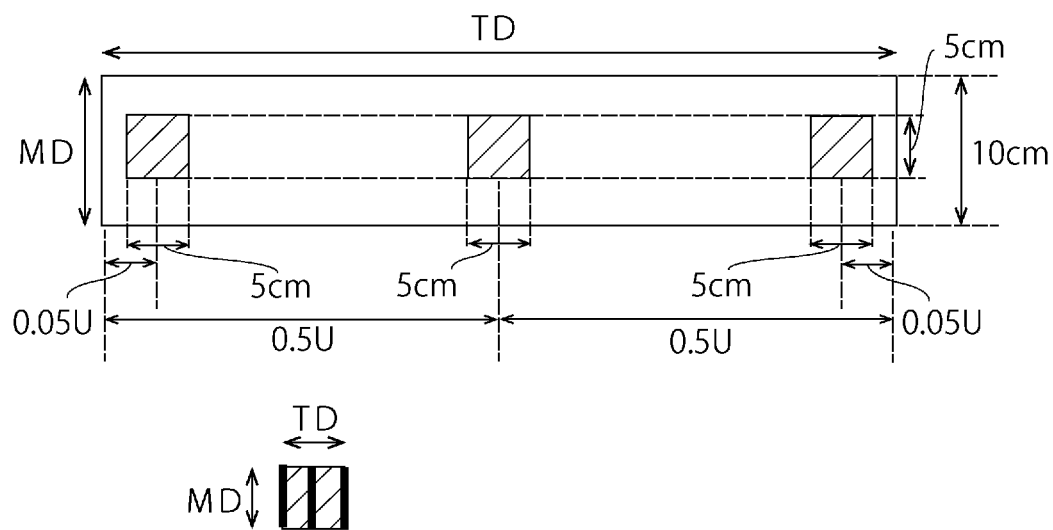
[FIG. 8.]
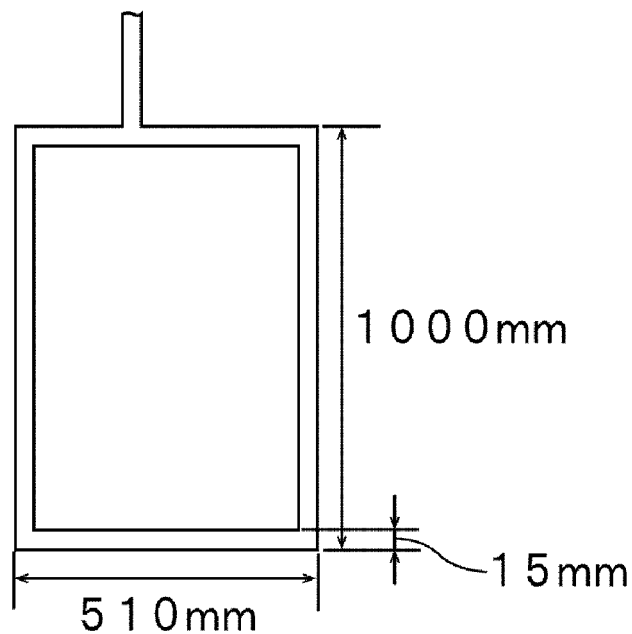

[FIG. 9.]
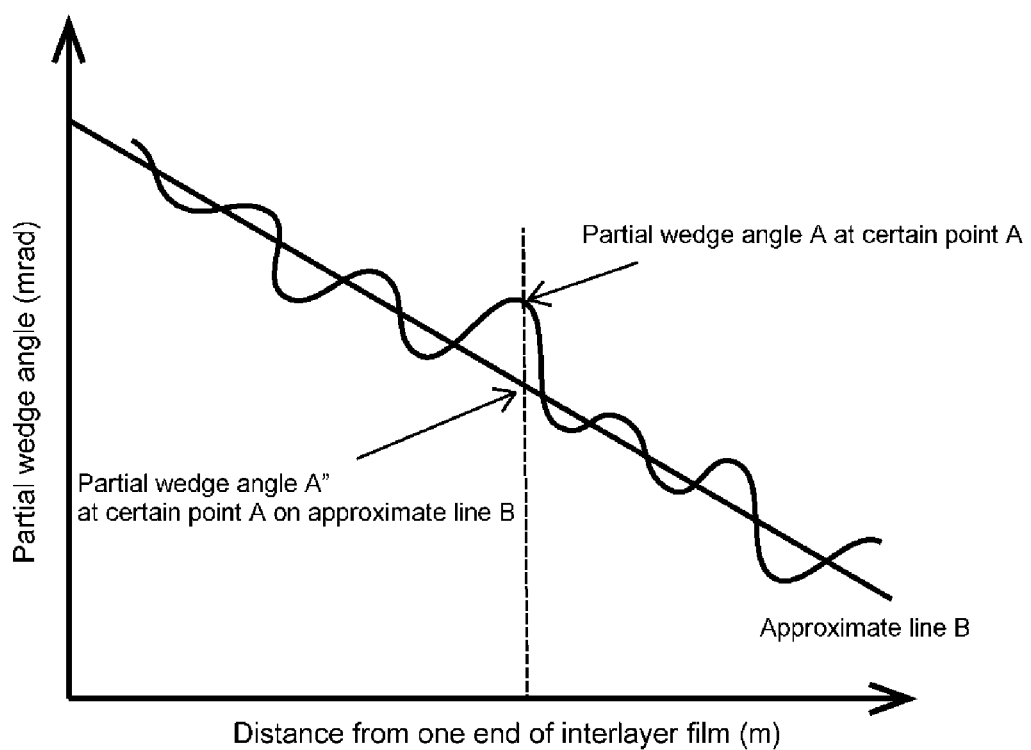

INTERLAYER FILM FOR LAMINATED GLASS, ROLL, AND LAMINATED GLASS

TECHNICAL FIELD

The present invention relates to an interlayer film for laminated glass which is used for obtaining laminated glass. Moreover, the present invention relates to a roll body and laminated glass both of which are prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between two glass plates.

Moreover, as the laminated glass used for automobiles, a head-up display (HUD) has been known. In a HUD, it is possible to display measured information including automobile traveling data such as speed on the windshield of the automobile, and the driver can recognize as if the display were shown in front of the windshield.

In the HUD, there is a problem that the measured information or the like is doubly observed.

In order to suppress double images, a wedge-like shaped interlayer film has been used. The following Patent Document 1 discloses a sheet of laminated glass in which a wedge-like shaped interlayer film having a prescribed wedge angle is sandwiched between a pair of glass plates. In such a laminated glass, by the adjustment of the wedge angle of the interlayer film, a display of measured information reflected by one glass plate and a display of measured information reflected by another glass plate can be focused into one point to make an image in the visual field of a driver. As such, the display of measured information is hard to be observed doubly and the visibility of a driver is hardly hindered.

RELATED ART DOCUMENT

Patent Document

Patent Document 1: JP H4-502525 T

SUMMARY OF THE INVENTION

Problems to be Solved by the Invention

Conventionally, a wedge angle of an interlayer film is adjusted to suppress double images. However, it is sometimes impossible to sufficiently suppress transmitted double images in the laminated glass only by adjusting the wedge angle of the interlayer film. The transmitted double images refer to the phenomenon that double images are observed, for example, by illumination of the headlamp of the car on the opposite lane.

Recent diversification in HUD leads to a demand for an interlayer film in which the wedge angle is not uniform. For example, when the wedge angle of the region for display of the interlayer film corresponding to the display region of HUD is large, the wedge angle of the region other than the region for display is sometimes made small. With such adjustment of the wedge angle, it is possible to prevent the wedge angle of the interlayer film as a whole from becoming too large. By preventing the wedge angle of the interlayer film as a whole from becoming too large, it is possible to suppress generation of creases and the like in the interlayer film. Also, winding deviation is less likely to occur when the interlayer film is formed into a roll body.

However, in the interlayer film in which the wedge angle is not uniform, a position where the wedge angle largely changes is easy to exist. Therefore, transmitted double images tend to be easily generated in the laminated glass. In particular, transmitted double images are sometimes generated at a position where the wedge angle largely changes in the laminated glass.

It is an object of the present invention to provide an interlayer film for laminated glass capable of suppressing transmitted double images in the laminated glass. It is also an object of the present invention to provide a roll body and a laminated glass both of which are prepared with the interlayer film for laminated glass.

Means for Solving the Problems

According to a broad aspect of the present invention, there is provided an interlayer film for laminated glass (in the present description, "interlayer film for laminated glass" is sometimes abbreviated as "interlayer film") having one end, and the other end being at an opposite side of the one end, wherein the other end has a thickness larger than a thickness of the one end, and when an inclination of approximate line A and a maximum value of absolute values of deviation in partial wedge angle are calculated according to the following determination of formula of approximate line A and calculation of deviation in partial wedge angle, the inclination of approximate line A is −0.05 mrad/m or less in at least one section A, and the maximum value of absolute values of deviation in partial wedge angle is 0.2 mrad or less.

Determination of formula of approximate line A and calculation of deviation in partial wedge angle: a formula of approximate line A is determined and deviation in partial wedge angle is calculated in the order of the following steps 1 to 4.

In step 1, a position of 40 mm from the one end toward the other end of the interlayer film is referred to as a start point X, and a position of 40 mm from the other end toward the one end of the interlayer film is referred to as an end point X. Points A are selected at 1-mm intervals from the start point X toward the end point X.

In step 2, a partial wedge angle A in each partial region A of 80 mm centered at each of the points A in a direction connecting the one end and the other end is calculated to obtain "partial wedge angle A at each point A".

In step 3, a position of 190 mm from the one end toward the other end of the interlayer film is referred to as a start point Y, and a position of 190 mm from the other end toward the one end of the interlayer film is referred to as an end point Y. Sections A of 300 mm are set at 1-mm intervals from the start point Y toward the end point Y such that the center of each section A is positioned between the start point Y and the end point Y.

In step 4, the following formula of approximate line A, and the following deviation in partial wedge angle are determined.

Formula of approximate line A: in each section A, an approximate line is prepared by plotting "distance from the one end of the interlayer film" on the x-axis, and "partial wedge angle A" on the y-axis from "partial wedge angle A at each point A" where the point A exists in the section A, and a formula of approximate line A in each section A is determined.

Deviation in partial wedge angle: from the formula of approximate line A, partial wedge angle A' at each point A is calculated, to obtain "partial wedge angle A' at each point A on approximate line A". In each section A, from "partial wedge angle A at each point A" where the point A exists in the section A and "partial wedge angle A' at each point A on approximate line A", deviation in partial wedge angle in each section A is determined.

In a specific aspect of the interlayer film according to the present invention, in at least one section A contained between a position of 100 mm from the one end toward the other end of the interlayer film, and a position of 600 mm from the one end toward the other end of the interlayer film, the inclination of approximate line A is −0.05 mrad/m or less, and the maximum value of absolute values of deviation in partial wedge angle is 0.2 mrad or less.

In a specific aspect of the interlayer film according to the present invention, in at least one section A contained between a position of 600 mm from the one end toward the other end of the interlayer film, and the other end of the interlayer film, the inclination of approximate line A is −0.05 mrad/m or less, and the maximum value of absolute values of deviation in partial wedge angle is 0.2 mrad or less.

In a specific aspect of the interlayer film according to the present invention, when an inclination of approximate line B and a maximum value of absolute values of deviation in partial wedge angle are calculated according to the following determination of formula of approximate line B and calculation of deviation in partial wedge angle, the inclination of approximate line B is −0.05 mrad/m or less, and the maximum value of absolute values of deviation in partial wedge angle is 0.2 mrad or less in a section B.

Determination of formula of approximate line B and calculation of deviation in partial wedge angle: a formula of approximate line B is determined and deviation in partial wedge angle is calculated in the order of the following steps 5 and 6.

In step 5, a section between a position of 50 mm from the one end toward the other end of the interlayer film, and a position of 50 mm from the other end toward the one end of the interlayer film is set as section B.

In step 6, the following formula of approximate line B, and the following deviation in partial wedge angle are determined.

Formula of approximate line B: in section B, an approximate line B is prepared by plotting "distance from the one end of the interlayer film" on the x-axis, and "partial wedge angle A" on the y-axis from "partial wedge angle A at each point A" where the point A exists in the section B, and a formula of approximate line B in section B is determined.

Deviation in partial wedge angle: from the formula of approximate line B, partial wedge angle A" at each point A is calculated, to obtain "partial wedge angle A" at each point A on approximate line B". In section B, from "partial wedge angle A at each point A" where the point A exists in the section B and "partial wedge angle A" at each point A on approximate line B", deviation in partial wedge angle in section B is determined.

In a specific aspect of the interlayer film according to the present invention, at least one of outer surfaces of the interlayer film is embossed.

In a specific aspect of the interlayer film according to the present invention, a region of 50% or more of the embossed outer surface of the interlayer film has a ten-point average roughness within ±30% of an average value of ten-point average roughness of the entire embossed outer surface of the interlayer film.

In a specific aspect of the interlayer film according to the present invention, when a distance between the one end and the other end of the interlayer film is referred to as U, among three heat shrinkage rates: a first heat shrinkage rate at 150° C. in an MD direction at a first position of 0.05 U from the one end toward the other end, a second heat shrinkage rate at 150° C. in an MD direction at a second position of 0.5 U from the one end toward the other end, and a third heat shrinkage rate at 150° C. in an MD direction at a third position of 0.95 U from the one end toward the other end, an absolute value of difference between a maximum heat shrinkage rate and a minimum heat shrinkage rate is 15% or less.

In a specific aspect of the interlayer film according to the present invention, the interlayer film has a maximum thickness of 1700 μm or less.

According to a broad aspect of the present invention, there is provided a roll body including a winding core and the above-described interlayer film for laminated glass, the interlayer film for laminated glass being wound around an outer periphery of the winding core.

According to a broad aspect of the present invention, there is provided a laminated glass including a first lamination glass member, a second lamination glass member, and the above-described interlayer film for laminated glass, the interlayer film for laminated glass being arranged between the first lamination glass member and the second lamination glass member.

Effect of the Invention

The interlayer film for laminated glass according to the present invention has one end and the other end being at the opposite side of the one end, and the other end has a thickness that is larger than a thickness of the one end. On the basis of the determination of formula of approximate line A and calculation of deviation in partial wedge angle, an inclination of approximate line A and a maximum value of absolute values of deviation in partial wedge angle are calculated. When the calculation is made, the inclination of approximate line A is −0.05 mrad/m or less, and the maximum value of absolute values of deviation in partial wedge angle is 0.2 mrad or less in at least one section A in the interlayer film for laminated glass according to the present invention. Since the interlayer film for laminated glass according to the present invention has the above configuration, it is possible to suppress transmitted double images in the laminated glass.

BRIEF DESCRIPTION OF DRAWINGS

FIGS. 1(a) and (b) are a sectional view and a front view, respectively, schematically showing an interlayer film for laminated glass, in accordance with a first embodiment of the present invention.

FIGS. 2(a) and (b) are a sectional view and a front view, respectively, schematically showing an interlayer film for laminated glass, in accordance with a second embodiment of the present invention.

FIG. 3 is a sectional view schematically showing an interlayer film for laminated glass in accordance with a third embodiment of the present invention.

FIG. 4 is a sectional view schematically showing an interlayer film for laminated glass in accordance with a fourth embodiment of the present invention.

FIG. 5 is a sectional view showing one example of a laminated glass prepared with the interlayer film for laminated glass shown in FIG. 1.

FIG. 6 is a perspective view schematically showing a roll body prepared by winding the interlayer film for laminated glass shown in FIG. 1.

FIG. 7 is a figure for explaining an interlayer film (test piece) for measuring a heat shrinkage rate.

FIG. 8 is a figure for explaining a preliminary pressing method used in evaluation of reflected double images and transmitted double images in Examples.

FIG. 9 is a schematic diagram showing the relationship between the distance from the one end of the interlayer film and the partial wedge angle in section B in the interlayer film of FIG. 3.

MODE(S) FOR CARRYING OUT THE INVENTION

Hereinafter, the details of the present invention will be described.

The interlayer film for laminated glass (in the present specification, sometimes abbreviated as "interlayer film") according to the present invention is used for laminated glass.

The interlayer film according to the present invention has a one-layer structure or a two or more-layer structure. The interlayer film according to the present invention may have a one-layer structure or may have a two or more-layer structure. The interlayer film according to the present invention may have a two-layer structure, may have a three-layer structure, or may have a three or more-layer structure. The interlayer film according to the present invention may be a single-layered interlayer film or may be a multi-layered interlayer film.

The interlayer film according to the present invention has one end and the other end being at the opposite side of the one end. The one end and the other end are end parts of both sides facing each other in the interlayer film. In the interlayer film according to the present invention, the thickness of the other end is larger than the thickness of the one end.

In the interlayer film according to the present invention, determination of formula of approximate line A and calculation of deviation in partial wedge angle are conducted.

Determination of formula of approximate line A and calculation of deviation in partial wedge angle: a formula of approximate line A is determined and deviation in partial wedge angle is calculated in the order of the following steps 1 to 4.

In step 1, a position of 40 mm from the one end toward the other end of the interlayer film is referred to as a start point X, and a position of 40 mm from the other end toward the one end of the interlayer film is referred to as an end point X. Points A are selected at 1-mm intervals from the start point X toward the end point X.

In step 2, a partial wedge angle A in each partial region A of 80 mm centered at each of the points A in a direction connecting the one end and the other end is calculated to obtain "partial wedge angle A at each point A".

In step 3, a position of 190 mm from the one end toward the other end of the interlayer film is referred to as a start point Y, and a position of 190 mm from the other end toward the one end of the interlayer film is referred to as an end point Y. Sections A of 300 mm are set at 1-mm intervals from the start point Y toward the end point Y such that the center of each section A is positioned between the start point Y and the end point Y.

In step 4, the following formula of approximate line A, and the following deviation in partial wedge angle are determined.

Formula of approximate line A: in each section A, an approximate line A is prepared by plotting "distance from the one end of the interlayer film" on the x-axis, and "partial wedge angle A" on the y-axis from "partial wedge angle A at each point A" where the point A exists in the section A, and a formula of the approximate line A in each section A is determined.

Deviation in partial wedge angle: from the formula of approximate line A, partial wedge angle A' at each point A is calculated, to obtain "partial wedge angle A' at each point A on approximate line A". In each section A, from "partial wedge angle A at each point A" where the point A exists in the section A and "partial wedge angle A' at each point A on approximate line A", deviation in partial wedge angle in each section A is determined.

In the step 1, points A are set at 1-mm intervals. Points are selected up to the position where selection of points at 1-mm intervals can be made from the one end side toward the other end side of the interlayer film (positions of which interval is not less than 1 mm). The point A closest to the one end side of the interlayer film is point A1 at a position of 40 mm from the one end toward the other end of the interlayer film, and the next point A is point A2 at a position of 41 mm from the one end toward the other end of the interlayer film. Point An is at a position of (39+n) mm (n is a natural number) from the one end toward the other end of the interlayer film.

In the step 2, the partial region A closest to the one end side of the interlayer film is partial region A1 of 0 mm to 80 mm from the one end, and the next partial region A is partial region A2 of 1 mm to 81 mm from the one end. Partial region An is a partial region of (n−1) mm to (79+n) mm (n is a natural number) from the one end. Neighboring two partial regions A overlap with each other by 79 mm in the direction connecting the one end and the other end.

In the step 2, for each point A, partial region A is set. A partial wedge angle calculated in each partial region A is referred to as partial wedge angle A. The partial wedge angle A is referred to as "partial wedge angle A at each point A". In partial region A1 at point A1 that is closest to the one end side of the interlayer film, partial wedge angle A1 at point A1 is calculated, and partial wedge angle A2 at point A2 is calculated in partial region A2 at the next point A2. The partial wedge angle A in the region closest to the one end side of the interlayer film is a partial wedge angle in a region of 0 mm to 80 mm from the one end of the interlayer film (partial wedge angle A1 in partial region A1), and the next partial wedge angle A is a partial wedge angle in a region of 1 mm to 81 mm from the one end of the interlayer film (partial wedge angle A2 in partial region A2).

Specifically, partial wedge angle A is measured in the following manner.

Measuring points P are selected at 1-mm intervals from the end part of the one end side of partial region A as a start point Z, to the end part of the other end side of partial region A as an end point Z. Therefore, in one partial region A, 81 measuring points P are selected. At each of the measuring points P, thickness of the interlayer film is measured. Plotting the distance (unit: mm) from the one end side of the interlayer film on the x-axis, and the thickness (unit: mm) of the interlayer film on the y-axis, an approximate line is obtained by the least-square method. The interior angle formed by the obtained approximate line and the line of y=0 is defined as partial wedge angle A.

In the step 3, sections A are set from the start point Y (the position of 190 mm from the one end toward the other end of the interlayer film) toward the end point Y (the position of 190 mm from the other end toward the one end of the interlayer film) up to the position where sections of 300 mm can be set at 1-mm intervals (the position where the section is not less than 300 mm) such that the center of each section A is positioned between the start point Y and the end point Y.

In the step 3, sections A are set at 1-mm intervals. The section A closest to the one end side of the interlayer film is section A1 of 40 mm to 340 mm from the one end of the interlayer film, and the next section A is section A2 of 41 mm to 341 mm from the one end of the interlayer film. Section An is a section of (n−1) mm to (299+n) mm (n is a natural number) from the start point. Each section An is a partial region of (39+n) mm to (339+n) mm (n is a natural number) from the one end of the interlayer film. Neighboring two sections A overlap with each other by 299 mm in the direction connecting the one end and the other end. In one section A, there are 301 points A.

In the step 4, in each of sections A, a formula of the approximate line and deviation in partial wedge angle are determined from "partial wedge angle A at each point A" where the point A exists in the section A (the centered point A in the step 2).

In the first section A (section A1), partial wedge angle A1 to partial wedge angle A301 exist, and in the next section A (section A2), partial wedge angle A2 to partial wedge angle A302 exist. In one section A, there are 301 partial wedge angles A.

Specifically, a formula of approximate line A is measured in the following manner.

In each of sections A, approximate line A is prepared for 301 partial wedge angles A. Plotting "distance (unit: m) from the one end of interlayer film" on the x-axis, and "partial wedge angle A (unit: mrad)" on the y-axis, approximate line A is obtained by the least-square method. "Distance from the one end of the interlayer film" of partial wedge angle A in the x-axial direction is a distance between one end of the interlayer film and the point A that is centered in the step 2. The x coordinate in partial wedge angle A1 is x=0.040 m (40 mm). The x coordinate in partial wedge angle A2 is x=0.041 m (41 mm). The distance in the x-axial direction in one section A is 0.300 m (300 mm). In one section A, one formula of approximate line A is obtained.

Specifically, deviation in partial wedge angle is measured in the following manner.

From the formula of approximate line A, partial wedge angle A' at each point A is calculated, to obtain "partial wedge angle A' at each point A on approximate line A". Therefore, in each of sections A, 301 partial wedge angles A' are obtained. In each of sections A, from 301 partial wedge angles A and 301 partial wedge angles A', deviation in partial wedge angle is determined, respectively. In one section A, deviation in 301 partial wedge angles is obtained.

In the interlayer film according to the present invention, when an inclination of approximate line A and a maximum value of absolute values of deviation in partial wedge angle are calculated according to the determination of formula of approximate line A and calculation of deviation in partial wedge angle, the inclination of approximate line A is −0.05 mrad/m or less, and the maximum value of absolute values of deviation in partial wedge angle is 0.2 mrad or less in at least one section A. In the interlayer film according to the present invention, there is a section A (section of 300 mm) that satisfies the configuration "the inclination of approximate line A is −0.05 mrad/m or less, and the maximum value of absolute values of deviation in partial wedge angle is 0.2 mrad or less". The section A that satisfies the configuration "the inclination of approximate line A is −0.05 mrad/m or less, and the maximum value of absolute values of deviation in partial wedge angle is 0.2 mrad or less" may exist singly or plurally. From the viewpoint of suppressing transmitted double images more effectively, it is preferred that the section A that satisfies the configuration "the inclination of approximate line A is −0.05 mrad/m or less, and the maximum value of absolute values of deviation in partial wedge angle is 0.2 mrad or less" exist plurally.

Since the interlayer film according to the present invention has the above configuration, it is possible to suppress transmitted double images in the laminated glass. In the interlayer film according to the present invention, it is possible to suppress transmitted double images in the laminated glass in a region where the inclination of approximate line A is −0.05 mrad/m or less, and the maximum value of absolute values of deviation in partial wedge angle is 0.2 mrad or less. Also, since the interlayer film according to the present invention has the above configuration, it is possible to suppress reflected double images in the laminated glass. In the interlayer film according to the present invention, it is possible to suppress reflected double images in the laminated glass in a region where the inclination of approximate line A is −0.05 mrad/m or less, and the maximum value of absolute values of deviation in partial wedge angle is 0.2 mrad or less.

The transmitted double images refer to the phenomenon that double images are observed, for example, by illumination of the headlamp of the car on the opposite lane.

The reflected double images refer to the phenomenon that double images are observed, for example, by information irradiation from an information display device.

In at least one section A contained between the position of 100 mm from the one end toward the other end of the interlayer film, and the position of 600 mm from the one end toward the other end of the interlayer film, it is preferred that the inclination of approximate line A be −0.05 mrad/m or less, and the maximum value of absolute values of deviation in partial wedge angle be 0.2 mrad or less. It is preferred that the section A satisfying the configuration "the inclination of approximate line A is −0.05 mrad/m or less, and the maximum value of absolute values of deviation in partial wedge angle is 0.2 mrad or less" exist between the position of 100 mm from the one end toward the other end of the interlayer film, and the position of 600 mm from the one end toward the other end of the interlayer film. In this case, it is possible to suppress transmitted double images and reflected double images more effectively, and it is possible to suppress, in particular, reflected double images more effectively.

Whether the section A exists in a certain position of the interlayer film is determined according to whether the entire section A of 300 mm exists in the certain position. Whether the section A exists between the position of 100 mm from the one end toward the other end of the interlayer film, and the position of 600 mm from the one end toward the other end of the interlayer film is determined according to whether the entire section A of 300 mm exists between the position of 100 mm from the one end toward the other end of the interlayer film, and the position of 600 mm from the one end toward the other end of the interlayer film.

In all sections A contained between the position of 100 mm from the one end toward the other end of the interlayer film, and the position of 600 mm from the one end toward the other end of the interlayer film, it is preferred that the inclination of approximate line A be −0.05 mrad/m or less, and the maximum value of absolute values of deviation in partial wedge angle be 0.2 mrad or less. In this case, it is possible to suppress transmitted double images and reflected double images still more effectively, and it is possible to suppress, in particular, reflected double images still more effectively.

In at least one section A contained between the position of 100 mm from the one end toward the other end of the interlayer film, and the position of 600 mm from the one end toward the other end of the interlayer film, the maximum value of absolute values of deviation in partial wedge angle is preferably 0.2 mrad or less. The maximum value of absolute values of deviation in partial wedge angle is more preferably 0.17 mrad or less, still more preferably 0.15 mrad or less, further preferably 0.14 mrad or less, still further preferably 0.13 mrad or less, especially preferably 0.10 mrad or less. In this case, it is possible to suppress transmitted double images and reflected double images still more effectively, and it is possible to suppress, in particular, reflected double images still more effectively.

In at least one section A contained between the position of 200 mm from the one end toward the other end of the interlayer film, and the position of 600 mm from the one end toward the other end of the interlayer film, it is preferred that the inclination of approximate line A be −0.05 mrad/m or less, and the maximum value of absolute values of deviation in partial wedge angle be 0.2 mrad or less. It is preferred that the section A satisfying the configuration "the inclination of approximate line A is −0.05 mrad/m or less, and the maximum value of absolute values of deviation in partial wedge angle is 0.2 mrad or less" exist between the position of 200 mm from the one end toward the other end of the interlayer film, and the position of 600 mm from the one end toward the other end of the interlayer film. In this case, it is possible to suppress transmitted double images and reflected double images more effectively, and it is possible to suppress, in particular, reflected double images more effectively.

In all sections A contained between the position of 200 mm from the one end toward the other end of the interlayer film, and the position of 500 mm from the one end toward the other end of the interlayer film, it is preferred that the inclination of approximate line A be −0.05 mrad/m or less, and the maximum value of absolute values of deviation in partial wedge angle be 0.2 mrad or less. In this case, it is possible to suppress transmitted double images and reflected double images still more effectively, and it is possible to suppress, in particular, reflected double images still more effectively.

In at least one section A contained between the position of 600 mm from the one end toward the other end of the interlayer film, and the other end of the interlayer film, it is preferred that the inclination of approximate line A be −0.05 mrad/m or less, and the maximum value of absolute values of deviation in partial wedge angle be 0.2 mrad or less. It is preferred that the section A satisfying the configuration "the inclination of approximate line A is −0.05 mrad/m or less, and the maximum value of absolute values of deviation in partial wedge angle is 0.2 mrad or less" exist between the position of 600 mm from the one end toward the other end of the interlayer film, and the other end of the interlayer film. In this case, it is possible to suppress transmitted double images and reflected double images more effectively, and it is possible to suppress, in particular, transmitted double images more effectively.

In all sections A contained between the position of 600 mm from the one end toward the other end of the interlayer film, and the other end of the interlayer film, it is preferred that the inclination of approximate line A be −0.05 mrad/m or less, and the maximum value of absolute values of deviation in partial wedge angle be 0.2 mrad or less. In this case, it is possible to suppress transmitted double images and reflected double images more effectively, and it is possible to suppress, in particular, transmitted double images more effectively.

In at least one section A contained between the position of 600 mm from the one end toward the other end of the interlayer film, and the other end of the interlayer film, the maximum value of absolute values of deviation in partial wedge angle is preferably 0.2 mrad or less. The maximum value of absolute values of deviation in partial wedge angle is more preferably 0.17 mrad or less, still more preferably 0.15 mrad or less, further preferably 0.14 mrad or less, still further preferably 0.13 mrad or less. When the maximum value of absolute values of deviation in partial wedge angle in at least one section A contained between the position of 600 mm from the one end toward the other end of the interlayer film and the other end of the interlayer film is the above upper limit or less, it is possible to suppress reflected double images and transmitted double images more effectively, and it is possible to suppress, in particular, transmitted double images more effectively.

In at least one section A contained between the position of 700 mm from the one end toward the other end of the interlayer film, and the other end of the interlayer film, it is preferred that the inclination of approximate line A be −0.05 mrad/m or less, and the maximum value of absolute values of deviation in partial wedge angle be 0.2 mrad or less. It is preferred that the section A satisfying the configuration "the inclination of approximate line A is −0.05 mrad/m or less, and the maximum value of absolute values of deviation in partial wedge angle is 0.2 mrad or less" exist between the position of 700 mm from the one end toward the other end of the interlayer film, and the other end of the interlayer film. In this case, it is possible to suppress transmitted double images and reflected double images more effectively, and it is possible to suppress, in particular, transmitted double images more effectively.

In all sections A contained between the position of 700 mm from the one end toward the other end of the interlayer film, and the other end of the interlayer film, it is preferred that the inclination of approximate line A be −0.05 mrad/m or less, and the maximum value of absolute values of deviation in partial wedge angle be 0.2 mrad or less. It is preferred that the section A satisfying the configuration "the inclination of approximate line A is −0.05 mrad/m or less, and the maximum value of absolute values of deviation in partial wedge angle is 0.2 mrad or less" exist between the position of 700 mm from the one end toward the other end of the interlayer film, and the other end of the interlayer film. In this case, it is possible to suppress transmitted double images and reflected double images more effectively, and it is possible to suppress, in particular, transmitted double images more effectively.

In the interlayer film according to the present invention, the following determination of formula of approximate line B and calculation of deviation in partial wedge angle are conducted.

Determination of formula of approximate line B and calculation of deviation in partial wedge angle: a formula of approximate line B is determined and deviation in partial wedge angle is calculated in the order of the following steps 5 and 6. More specifically, a formula of approximate line B is determined and deviation in partial wedge angle is calculated in the order of the steps 1 and 2, and the following steps 5 and 6.

In step 5, a section between a position of 50 mm from the one end toward the other end of the interlayer film, and a position of 50 mm from the other end toward the one end of the interlayer film is set as section B.

In step 6, the following formula of approximate line B, and the following deviation in partial wedge angle are determined.

Formula of approximate line B: in section B, an approximate line B is prepared by plotting "distance from the one end of the interlayer film" on the x-axis, and "partial wedge angle A" on the y-axis from "partial wedge angle A at each point A" where the point A exists in the section B, and a formula of approximate line B in section B is determined.

Deviation in partial wedge angle: from the formula of approximate line B, partial wedge angle A" at each point A is calculated, to obtain "partial wedge angle A" at each point A on approximate line B". In section B, from "partial wedge angle A at each point A" where the point A exists in the section B and "partial wedge angle A" at each point A on approximate line B", deviation in partial wedge angle in section B is determined.

Specifically, a formula of approximate line B is measured in the following manner.

In section B, approximate line B is prepared for partial wedge angles A. The number of partial wedge angles B varies depending on the size of the interlayer film. Plotting "distance (unit: m) from the one end of the interlayer film" on the x-axis, and "partial wedge angle A (unit: mrad)" on the y-axis, approximate line B is obtained by the least-square method. "Distance from the one end of the interlayer film" of partial wedge angle A in the x-axial direction is a distance between one end of the interlayer film and the point A that is centered in the step 2. The x coordinate in partial wedge angle A1 is x=0.040 m (40 mm). The x coordinate in partial wedge angle A2 is x=0.041 m (41 mm). The distance in the x-axial direction in section B varies depending on the size of the interlayer film. In section B, one formula of approximate line B is obtained.

Specifically, deviation in partial wedge angle is measured in the following manner.

From the formula of approximate line B, partial wedge angle A" at each point A is calculated, to obtain "partial wedge angle A" at each point A on approximate line B". In section B, from each partial wedge angle A and each partial wedge angle A", deviation in partial wedge angle is determined, respectively.

In the interlayer film according to the present invention, when an inclination of approximate line B and a maximum value of absolute values of deviation in partial wedge angle are calculated according to the aforementioned determination of formula of approximate line B and calculation of deviation in partial wedge angle, it is preferred that the inclination of approximate line B be −0.05 mrad/m or less, and the maximum value of absolute values of deviation in partial wedge angle be 0.2 mrad or less in section B. In this case, it is possible to suppress both transmitted double images and reflected double images in the laminated glass.

The inclinations of approximate line A and approximate line B each are preferably −3 mrad/m or more, more preferably −2 mrad/m or more, and is preferably −0.07 mrad/m or less, more preferably −0.10 mrad/m or less. When the inclinations of approximate line A and approximate line B are the above lower limit or more and the above upper limit or less, it is possible to suppress transmitted double images and reflected double images more effectively.

Intercepts of the approximate line A and the approximate line B each are preferably 0.05 mrad or more, more preferably 0.1 mrad or more, and is preferably 3 mrad or less, more preferably 2 mrad or less. When the intercepts of approximate line A and approximate line B are the above lower limit or more and the above upper limit or less, it is possible to suppress transmitted double images and reflected double images more effectively.

The maximum value of absolute values of deviation in partial wedge angle is preferably 0.2 mrad or less, more preferably 0.17 mrad or less, further preferably 0.15 mrad or less, especially preferably 0.14 mrad or less, most preferably 0.13 mrad or less. When the maximum value of absolute values of deviation in partial wedge angle is the above lower limit or more and the above upper limit or less, it is possible to suppress transmitted double images and reflected double images more effectively. It is preferred that the maximum value of deviation in partial wedge angle be as small as possible.

As a method for controlling the inclinations and the intercepts of approximate line A and approximate line B, and the maximum value of absolute values of deviation in partial wedge angle to fall within the preferred ranges, the following methods can be recited. (1) Adjustment of gap of die outlet (2) Adjustment of degree of kneading of resin composition in melting section of extruder (3) Adjustment of temperature of resin composition at extrusion outlet By appropriately combining these methods, it is possible to control the inclinations and the intercepts of approximate line A and approximate line B, and the maximum value of absolute values of deviation in partial wedge angle to fall within the preferred ranges.

It is preferred that the thickness increases from the one end toward the other end in a region of 80% or more (more preferably 85% or more, further preferably 905 or more, particularly preferably 95% or more) in the region between the position of 10 cm toward the other end from the one end of the interlayer film and the position of 60 cm toward the other end from the one end. In this case, it is possible to suppress reflected double images more effectively.

The interlayer film according to the present invention is suitably used for laminated glass that is a head-up display (HUD). It is preferred that the interlayer film according to the present invention be an interlayer film for HUD.

It is preferred that the interlayer film according to the present invention have a region for display corresponding to a display region of HUD. From the viewpoint of suppressing transmitted double images and reflected double images more effectively, it is preferred that the interlayer film according to the present invention have the region for display in a region extending from a position of 10 cm from the one end toward the other end to a position of 60 cm from the one end toward the other end.

From the viewpoint of effectively suppressing transmitted double images and reflected double images, it is preferred that the interlayer film have a portion with a wedge-like sectional shape in the thickness direction in the region between a position of 60 cm toward the other end from the one end and a position of 10 cm toward the one end from the other end. The portion with a wedge-like sectional shape in the thickness direction may exist at least partially in the above region.

The interlayer film according to the present invention may have a shading region. The shading region may be separate from the region for display. The shading region is provided so as to prevent a driver from feeling glare while driving, for example, by sunlight or outdoor lighting. The shading region can be provided so as to impart the heat blocking property. It is preferred that the shading region be located in an edge portion of the interlayer film. It is preferred that the shading region be belt-shaped.

In the shading region, a coloring agent or a filler may be used so as to change the color and the visible light transmittance. The coloring agent or the filler may be contained in a partial region in the thickness direction of the interlayer film or may be contained in the entire region in the thickness direction of the interlayer film.

From the viewpoint of providing better display, and further broadening the field of view, the visible light transmittance of the region for display is preferably 60% or more, more preferably 70% or more, further preferably 80% or more, especially preferably 88% or more, most preferably 90% or more. It is preferred that the visible light transmittance of the region for display be higher than the visible light transmittance of the shading region. The visible light transmittance of the region for display may be lower than the visible light transmittance of the shading region. The visible light transmittance of the region for display is higher than the visible light transmittance of the shading region preferably by 50% or more, more preferably by 60% or more.

When the visible light transmittance varies in the interlayer film of each of the region for display and the shading region, the visible light transmittance is measured at the center position of the region for display and at the center position of the shading region.

The visible light transmittance at a wavelength ranging from 380 nm to 780 nm of the obtained laminated glass can be measured by using a spectrophotometer ("U-4100" available from Hitachi High-Tech Corporation) in conformity with JIS R3211:1998. As the glass plate, it is preferred to use clear glass having a thickness of 2 mm.

It is preferred that the region for display have a length direction and a width direction. For excellent versatility of the interlayer film, it is preferred that the width direction of the region for display be the direction connecting the one end and the other end. It is preferred that the region for display be belt-shaped.

It is preferred that the interlayer film have an MD direction and a TD direction. For example, the interlayer film is obtained by melt extrusion molding. The MD direction is a flow direction of an interlayer film at the time of producing the interlayer film. The TD direction is a direction orthogonal to the flow direction of an interlayer film at the time of producing the interlayer film and a direction orthogonal to the thickness direction of the interlayer film. It is preferred that the one end and the other end be located at the opposite sides of the TD direction.

From the viewpoint of better display, it is preferred that the interlayer film have a portion with a wedge-like sectional shape in the thickness direction. It is preferred that the sectional shape in the thickness direction of the region for display be a wedge-like shape.

It is preferred that the interlayer film have a portion with a wedge-like sectional shape in the thickness direction. It is preferred that the interlayer film have a portion where the thickness gradually increases from one end toward the other end. It is preferred that the sectional shape in the thickness direction of the interlayer film be a wedge-like shape. Examples of the sectional shape in the thickness direction of the interlayer film include a trapezoidal shape, a triangular shape, a pentagonal shape, and the like.

From the viewpoint of further suppressing double images, it is preferred that the interlayer film have a portion where the increment of the thickness increases from the one end side to the other end side in the region where the thickness increases. From the viewpoint of further suppressing double images, it is preferred that the interlayer film have a portion where the wedge angle increases from the one end side to the other end side in the region where the sectional shape in the thickness direction is a wedge-like shape.

In order to suppress double images, the wedge angle ($\theta$) of the interlayer film can be appropriately set according to the fitting angle of laminated glass. The wedge angle ($\theta$) is a wedge angle of the interlayer film as a whole. From the viewpoint of further suppressing double images, the wedge angle ($\theta$) of the interlayer film is preferably 0.1 mrad (0.00575 degrees) or more, more preferably 0.2 mrad (0.0115 degrees) or more, and is preferably 2 mrad (0.1146 degrees) or less, more preferably 0.8 mrad (0.0458 degrees) or less. The wedge angle ($\theta$) of the interlayer film is an interior angle formed at the intersection point between a straight line connecting surface parts on the one side of the interlayer film (first surface part) of the maximum thickness part and the minimum thickness part in the interlayer film, and a straight line connecting surface parts of the other side of the interlayer film (second surface part) of the maximum thickness part and the minimum thickness part in the interlayer film.

When there are a plurality of maximum thicknesses parts, there are a plurality of minimum thicknesses parts, or the minimum thickness part is located in a certain region, the maximum thickness part and the minimum thickness part for determining the wedge angle ($\theta$) are selected such that the wedge angle ($\theta$) to be determined is the maximum.

The wedge angle ($\theta$) can be approximately calculated in the following manner. Thickness of the interlayer film is measured at each of the maximum thickness part and the minimum thickness part. On the basis of the result of (an absolute value of difference between the thickness in the maximum thickness part and the thickness in the minimum thickness part (μm)÷a distance between the maximum thickness part and the minimum thickness part (mm)), a wedge angle ($\theta$) is approximately calculated.

In general, the larger the wedge angle ($\theta$) of the interlayer film, the easier transmitted double images in the laminated glass tend to be generated. In the present invention, it is possible to make transmitted double images in the laminated glass difficult to be generated even if the wedge angle ($\theta$) of the interlayer film is large.

The thickness of the interlayer film is not particularly limited. The thickness of the interlayer film refers to the total thickness of the respective layers constituting the interlayer film. Thus, in the case of a multi-layered interlayer film including a first layer, a second layer and a third layer, the thickness of the interlayer film refers to the total thickness of the first layer, the second layer, and the third layer.

A distance between the one end and the other end is referred to as U. It is preferred that the interlayer film have a minimum thickness in the region at a distance of 0 U to 0.2 U inwardly from the one end, and a maximum thickness in the region at a distance of 0 U to 0.2 U inwardly from the other end. It is more preferred that the interlayer film have a minimum thickness in the region at a distance of 0 U to 0.1 U inwardly from the one end, and a maximum thickness in the region at a distance of 0 U to 0.1 U inwardly from the other end. It is preferred that the interlayer film have a minimum thickness at the one end and the interlayer film have a maximum thickness at the other end.

The maximum thickness of the interlayer film is preferably 100 μm or more, more preferably 250 μm or more, further preferably 500 μm or more, especially preferably 800 μm or more, and is preferably 3 mm or less, more preferably 2 mm or less, further preferably 1700 μm or less, especially preferably 1500 μm or less.

From the viewpoint of the practical aspect and the viewpoint of sufficiently enhancing the adhesive strength and the penetration resistance, the maximum thickness of a surface layer is preferably 0.001 mm or more, more preferably 0.2 mm or more, further preferably 0.3 mm or more, and is preferably 1 mm or less, and more preferably 0.8 mm or less.

From the viewpoint of the practical aspect and the viewpoint of sufficiently enhancing the penetration resistance, the maximum thickness of a layer (intermediate layer) arranged between two surface layers is preferably 0.001 mm or more, more preferably 0.1 mm or more, and further preferably 0.2 mm or more and is preferably 0.8 mm or less, more preferably 0.6 mm or less, and further preferably 0.3 mm or less.

The distance U between the one end and the other end of the interlayer film is preferably 0.5 m or more, more preferably 0.8 m or more, especially preferably 1 m or more, and is preferably 3 m or less, more preferably 2 m or less, especially preferably 1.5 m or less.

As a measuring device for use for measurement of a wedge angle of the interlayer film, and a thickness of the interlayer film, a contact type thickness measuring instrument "TOF-4R" (available from Yamabun Electronics Co., Ltd.) or the like can be recited.

Measurement of the thickness is conducted such that the distance is the shortest from the one end toward the other end by using the above-described measuring device at a film conveyance speed of 2.15 mm/minute to 2.25 mm/minute.

An appropriate measuring device is used for measuring the wedge angle (θ) of the interlayer film after the interlayer film is made into a laminated glass, and the thickness of the interlayer film. As the measuring device, a non-contact multi-layer measuring device "OPTIGAUGE" (available from Lumetrics, Inc.) or the like is recited. Use of this measuring instrument makes it possible to measure the thickness of the interlayer film while the interlayer film is in the laminated glass.

Hereinafter, specific embodiments of the present invention will be described with reference to the drawings.

FIGS. 1(a) and (b) are a sectional view and a front view, respectively, schematically showing an interlayer film for laminated glass in accordance with a first embodiment of the present invention. FIG. 1(a) is a sectional view along the line I-I in FIG. 1(b). The size and dimension of the interlayer film in FIG. 1 and later described drawings are appropriately changed from the actual size and shape for convenience of illustration.

In FIG. 1(a), a section in the thickness direction of an interlayer film 11 is shown. In this connection, in FIG. 1(a) and later described drawings, for convenience of illustration, the thicknesses of an interlayer film and respective layers constituting the interlayer film and the wedge angle (θ) are shown so as to be different from actual thicknesses thereof and an actual wedge angle.

The interlayer film 11 includes a first layer 1 (intermediate layer), a second layer 2 (surface layer), and a third layer 3 (surface layer). The second layer 2 is arranged on a first surface side of the first layer 1 to be layered thereon. The third layer 3 is arranged on a second surface side opposite to the first surface of the first layer 1 to be layered thereon. The first layer 1 is arranged between the second layer 2 and the third layer 3 to be sandwiched therebetween. The interlayer film 11 is used for obtaining laminated glass. The interlayer film 11 is an interlayer film for laminated glass. The interlayer film 11 is a multilayer interlayer film.

The interlayer film 11 has one end 11a and the other end 11b at the opposite side of the one end 11a. The one end 11a and the other end 11b are end parts of both sides facing each other. The sectional shape in the thickness direction of each of the second layer 2 and the third layer 3 is a wedge-like shape. The sectional shape in the thickness direction of the first layer 1 is a rectangular shape. The thicknesses of the second layer 2 and the third layer 3 are larger in the other end 11b side than in the one end 11a side. Accordingly, the thickness of the other end 11b of the interlayer film 11 is larger than the thickness of the one end 11a thereof. Accordingly, the interlayer film 11 has a region being thin in thickness and a region being thick in thickness.

The interlayer film 11 has a region where the thickness increases from the one end 11a side to the other end 11b side. In the interlayer film 11, the increment of the thickness is not constant from the one end 11a side to the other end 11b side in the region where the thickness increases.

The interlayer film 11 has a region where the thickness increases from the one end 11a side to the other end 11b side. The interlayer film 11 has a portion where the increment of the thickness decreases from the one end 11a side to the other end 11b side in the region where the thickness increases. The interlayer film 11 has a region with a wedge-like sectional shape in the thickness direction. The interlayer film 11 has a portion where the wedge angle decreases from the one end side to the other end side in the region with a wedge-like sectional shape in the thickness direction.

The interlayer film 11 has a region for display R1 corresponding to a display region of a head-up display. The interlayer film 11 has a surrounding region R2 neighboring the region for display R1. In the present embodiment, the region for display R1 is a region between a position of 18 cm toward the other end 11b from the one end 11a and a position of 63.8 cm toward the other end 11b from the one end 11a.

The interlayer film 11 has a shading region R3 that is separate from the region for display R1. The shading region R3 is located in an edge portion of the interlayer film 11.

The interlayer film has a shape as shown in FIG. 1(a), and may have a one-layer structure, a two-layer structure or four or more-layer structure.

FIG. 6 is a perspective view schematically showing a roll body prepared by winding the interlayer film for laminated glass shown in FIG. 1.

The interlayer film 11 may be wound to be formed into a roll body 51 of the interlayer film 11.

The roll body 51 shown in FIG. 6 includes a winding core 61 and the interlayer film 11. The interlayer film 11 is wound around an outer periphery of the winding core 61.

FIGS. 2(a) and (b) are a sectional view and a front view, respectively, schematically showing an interlayer film for laminated glass in accordance with a second embodiment of the present invention. FIG. 2(a) is a sectional view along the line I-I in FIG. 2(b). In FIG. 2(a), a section in the thickness direction of an interlayer film 11A is shown.

The interlayer film 11A shown in FIG. 2 includes a first layer 1A. The interlayer film 11A has a one-layer structure composed only of the first layer 1A and is a single-layered interlayer film. The interlayer film 11A is the first layer 1A. The interlayer film 11A is used for obtaining laminated glass. The interlayer film 11A is an interlayer film for laminated glass.

The interlayer film 11A has one end 11a and the other end 11b at the opposite side of the one end 11a. The one end 11a and the other end 11b are end parts of both sides facing each other. The thickness of the other end 11b of the interlayer film 11A is larger than the thickness of the one end 11a thereof. Accordingly, the first layer 1A corresponding to the interlayer film 11A has a region being thin in thickness and a region being thick in thickness.

The interlayer film 11A has a region where the thickness increases from the one end 11a side to the other end 11b side. In the interlayer film 11A, the increment of the thickness is not constant from the one end 11a side to the other end 11b side in the region where the thickness increases.

The interlayer film 11A has a region where the thickness increases from the one end 11a side to the other end 11b side. The interlayer film 11A has a portion where the increment of the thickness decreases from the one end 11a side to the other end 11b side in the region where the thickness increases. The interlayer film 11A has a region with a wedge-like sectional shape in the thickness direction. The interlayer film 11A has a portion where the wedge angle decreases from the one end side to the other end side in the region with a wedge-like sectional shape in the thickness direction.

The interlayer film 11A and the first layer 1A have portions 11Aa, 1Aa having a rectangular sectional shape in the thickness direction, and portions 11Ab, 1Ab having a wedge-like sectional shape in the thickness direction.

The interlayer film 11A has a region for display R1 corresponding to a display region of a head-up display. The interlayer film 11A has a surrounding region R2 neighboring the region for display R1.

The interlayer film 11A has a shading region R3 that is separate from the region for display R1. The shading region R3 is located in an edge portion of the interlayer film 11A.

The interlayer film has a shape as shown in FIG. 2(a) and may have a two or more layer structure.

FIG. 3 is a sectional view schematically showing an interlayer film for laminated glass in accordance with a third embodiment of the present invention. In FIG. 3, a section in the thickness direction of an interlayer film 11B is shown.

The interlayer film 11B shown in FIG. 3 includes a first layer 1B (intermediate layer), a second layer 2B (surface layer), and a third layer 3B (surface layer).

The interlayer film 11B has a region where the thickness increases from the one end 11a side toward the other end 11b side, and a region where the thickness decreases from the one end 11a side toward the other end 11b side. The interlayer film 11B has a portion where the increment of the thickness decreases from the one end 11a side to the other end 11b side in the region where the thickness increases. The interlayer film 11B has a region with a wedge-like sectional shape in the thickness direction. The interlayer film 11B has a portion where the wedge angle decreases from the one end side to the other end side in the region with a wedge-like sectional shape in the thickness direction.

FIG. 9 is a schematic diagram showing the relationship between the distance from the one end of the interlayer film and the partial wedge angle in section B in the interlayer film of FIG. 3. In FIG. 9, approximate line B, partial wedge angle A at a certain point A, and partial wedge angle A" are shown.

FIG. 4 is a sectional view schematically showing an interlayer film for laminated glass in accordance with a fourth embodiment of the present invention. In FIG. 4, a section in the thickness direction of an interlayer film 11C is shown.

The interlayer film 11C shown in FIG. 4 includes a first layer 1C. The interlayer film 11C has a one-layer structure composed only of the first layer 1C and is a single-layered interlayer film.

The interlayer film 11C has a region where the thickness increases from the one end 11a side toward the other end 11b side, and a region where the thickness decreases from the one end 11a side toward the other end 11b side. The interlayer film 11C has a portion where the increment of the thickness decreases from the one end 11a side to the other end 11b side in the region where the thickness increases. The interlayer film 11C has a region with a wedge-like sectional shape in the thickness direction. The interlayer film 11C has a portion where the wedge angle decreases from the one end side to the other end side in the region with a wedge-like sectional shape in the thickness direction.

The interlayer films 11, 11A have a maximum thickness at the other end 11b and a minimum thickness at the one end 11a. The interlayer films 11B, 11C have a maximum thickness between the one end 11a and the other end 11b, and a minimum thickness at the one end 11a.

A distance between the one end and the other end of the interlayer film is referred to as U. In the interlayer film, the following three heat shrinkage rates are determined. First heat shrinkage rate at 150° C. in the MD direction at the first position of 0.05 U from the one end toward the other end. Second heat shrinkage rate at 150° C. in the MD direction at the second position of 0.5 U from the one end toward the other end. Third heat shrinkage rate at 150° C. in the MD direction at the third position of 0.95 U from the one end toward the other end. In the interlayer film, among the three heat shrinkage rates: the first heat shrinkage rate, the second heat shrinkage rate and the third heat shrinkage rate, it is preferred that an absolute value of difference between the maximum heat shrinkage rate and the minimum heat shrinkage rate be 15% or less. In this case, it is possible to effectively suppress generation of a crease in the interlayer film, and to suppress transmitted double images and reflected double images.

From the viewpoint of suppressing generation of a crease in the interlayer film more effectively, and from the viewpoint of further suppressing transmitted double images and reflected double images, among the three heat shrinkage rates, the maximum heat shrinkage rate is preferably 50% or less, more preferably 48% or less, further preferably 46% or less, especially preferably 45% or less. Among the three heat shrinkage rates, the lower limit of the maximum heat shrinkage rate is not particularly limited. Among the three heat shrinkage rates, the maximum heat shrinkage rate is preferably more than 20%, more preferably 22% or more, further preferably 24% or more.

From the viewpoint of suppressing generation of a crease in the interlayer film more effectively, among the three heat shrinkage rates, an absolute value of difference between the maximum heat shrinkage rate and the minimum heat shrinkage rate is preferably 13% or less, more preferably 11% or less, further preferably 10% or less. The lower limit of the absolute value of difference between the maximum heat shrinkage rate and the minimum heat shrinkage rate is not particularly limited. The absolute value of difference between the maximum heat shrinkage rate and the minimum heat shrinkage rate may be 0%.

The heat shrinkage rate is measured in the following manner.

FIG. 7 is a figure for explaining an interlayer film (test piece) for measuring a heat shrinkage rate.

In FIG. 7, the one end and the other end of the interlayer film are located at the opposite sides of the TD direction. The distance between the one end and the other end is U. The obtained interlayer film is cut out from the one end to the other end in the TD direction to have a dimension of 10 cm in the MD direction. After cutting, the cut interlayer film is subjected to moisture conditioning at a temperature of 20° C. and a humidity of 30% RH for two days for the purpose of stabilization. Then, as shown in FIG. 7, test pieces are cut out at a first position of 0.05 U from the one end toward the other end, a second position of 0.5 U from one end toward the other end, and a third position of 0.95 U from the one end toward the other end. The test piece has a square shape of 5 cm in the MD direction and 5 cm in the TD direction. The test pieces are cut out in the middle of the MD direction of the test pieces. The test pieces are cut out such that the first position, the second position and the third position are centered. When the first position is not separated from the one end by 2.5 cm or more, the test piece is cut out such that the one end is one side of the test piece. When the third position is not separated from the other end by 2.5 cm or more, the test piece is cut out such that the other end is one side of the test piece.

The obtained test pieces are placed horizontally on a fluorine resin sheet, and left to stand at 150° C. for 0.5 hours. The dimension in the MD direction is measured before and after leaving to stand, and a heat shrinkage rate is determined according to the following formula.

The heat shrinkage rate in the MD direction of one test piece is measured at three sites: the end parts of opposite sides, and the middle part in the TD direction of the one test piece (three sites indicated by bold lines in FIG. 7). The average value of three measurements is determined as a heat shrinkage rate in the MD direction in the one test piece.

Heat shrinkage rate (%)=((Dimension in *MD* direction before heating−dimension in *MD* direction after heating)/dimension in *MD* direction before heating)×100

As a method for controlling the maximum heat shrinkage rate and the absolute value of difference between the maximum heat shrinkage rate and the minimum heat shrinkage rate in the preferable manner, the following methods can be recited. (1) Method of decreasing the difference in thickness between the maximum thickness and the minimum thickness of the interlayer film (2) Method of retaining the extruded interlayer film in a certain temperature range for a certain time in obtaining the interlayer film by melt extrusion molding (3) Method of winding the interlayer film at a constant tension in the entire TD direction at the time of producing the interlayer film By appropriately combining these methods, it is possible to control the maximum heat shrinkage rate and the absolute value of difference between the maximum heat shrinkage rate and the minimum heat shrinkage rate to fall within the preferred ranges.

It is preferred that the interlayer film have protrusions and recesses on the outer surface. In this case, it suffices that the interlayer film has protrusions and recesses on at least one surface of the outer surface of both sides. It is preferred that the interlayer film have protrusions and recesses on at least one surface of the outer surface of both sides. It is more preferred that the interlayer film have protrusions and recesses on the outer surface of both sides. It is preferred that at least one of the outer surfaces of the interlayer film be embossed. It is preferred that at least one surface of the outer surface of both sides of the interlayer film be embossed. It is preferred that the outer surface of both sides of the interlayer film be embossed.

Examples of the method for forming the protrusions and recesses include, but are not particularly limited to, a lip emboss method, an emboss roll method, a calender roll method, and a profile extrusion method, and the like. The emboss roll method is preferred because a large number of embosses of the protrusions and recesses, which is a quantitatively constant protrusion and recess pattern, can be formed.

It is preferred that a region of 50% or more of the embossed outer surface of the interlayer film have a ten-point average roughness within ±30% of an average value of ten-point average roughness of the entire embossed outer surface of the interlayer film, and it is more preferred that a region of 50% or more of the embossed outer surface of the interlayer film have a ten-point average roughness within ±25, of an average value of ten-point average roughness of the entire embossed outer surface of the interlayer film. It is more preferred that a region of 60% or more of the embossed outer surface of the interlayer film have a ten-point average roughness within ±30% of an average value of ten-point average roughness of the entire embossed outer surface of the interlayer film. It is further preferred that a region of 70% or more of the embossed outer surface of the interlayer film have a ten-point average roughness within ±30% of an average value of ten-point average roughness of the entire embossed outer surface of the interlayer film. In this case, it is possible to effectively prevent the blocking between films in the roll body.

The average value of the ten-point average roughness of the entire embossed outer surface of the interlayer film is preferably 15 μm or more, more preferably 25 μm or more, and is preferably 60 μm or less, more preferably 50 μm or less. When the average value of the ten-point average roughness of the entire embossed outer surface of the interlayer film is the above lower limit or more and the above upper limit or less, it is possible to effectively prevent the blocking between films in the roll body.

The ten-point average roughness is measured in accordance with JIS B0601:1994. As a measuring device for measuring the ten-point average roughness, for example, "Surfcorder SE500" available from Kosaka Laboratory Ltd. or the like may be used. More specifically, the ten-point average roughness can be measured using a stylus having a tip radius of 2 μm and a tip angle of 90° in measurement conditions of a cutoff value at the time of measurement of 2.5 mm, a standard length 2.5 mm, a measurement length of 12.5 mm, a spare length 2.5 mm, and a feed speed of stylus of 0.5 mm/second in an environment of 23° C. and 30 RH %.

The average value of the ten-point average roughness can be measured, for example, in the following manner. Measuring points are set at 5-mm intervals from the one end toward the other end of the interlayer film. At each measuring point, the measuring device is rotated every 45 degrees and the ten-point average roughness is measured eight times in total, and the maximum value of the measurements is determined as a ten-point average roughness at each measuring point. From the ten-point average roughness of each measuring point, an average value of ten-point average roughness of the entire outer surface of the interlayer film is determined.

Hereinafter, the details of materials constituting the respective layers of a multi-layered interlayer film and the single-layered interlayer film will be described.

(Thermoplastic Resin)

It is preferred that the interlayer film contain a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). The thermoplastic resin (1), the thermoplastic resin (2), and the thermoplastic resin (3) may be the same or different from one another. For still higher sound insulating properties, it is preferred that the thermoplastic resin (1) be different from the thermoplastic resin (2) and the thermoplastic resin (3). Each of the polyvinyl acetal resin (1), the polyvinyl acetal resin (2) and the polyvinyl acetal resin (3) may be the same or different from one another. For still higher sound insulating properties, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), and the thermoplastic resin (3) may be used alone and two or more kinds thereof may be used in combination. One kind of each of the polyvinyl acetal resin (0), the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used as the thermoplastic resin.

It is preferred that the thermoplastic resin be a polyvinyl acetal resin. By using a polyvinyl acetal resin and a plasticizer together, the adhesive strength of a layer containing the polyvinyl acetal resin and the plasticizer to a lamination glass member or another layer is further enhanced.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol (PVA) is preferably 200 or more, more preferably 500 or more, still more preferably 1500 or more, further preferably 1600 or more, especially preferably 2600 or more, most preferably 2700 or more, preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is preferably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone, and two or more kinds thereof may be used in combination.

The content of the hydroxyl group (the amount of hydroxyl groups) of the polyvinyl acetal resin (0) is preferably 15% by mole or more and more preferably 18% by mole or more and is preferably 40% by mole or less and more preferably 35% by mole or less. When the content of the hydroxyl group is the above lower limit or more, the adhesive strength of the interlayer film is further enhanced. Moreover, when the content of the hydroxyl group is the above upper limit or less, the flexibility of the interlayer film is enhanced and the handling of the interlayer film is facilitated.

A content of the hydroxyl group (the amount of hydroxyl groups) of the polyvinyl acetal resin (1) is preferably 17% by mole or more, more preferably 20% by mole or more, further preferably 25% by mole or more and is preferably 28% by mole or less, more preferably 27% by mole or less, further preferably 25% by mole or less, especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating properties of laminated glass are further enhanced. Moreover, when the content of the hydroxyl group is the above upper limit or less, the flexibility of the interlayer film is enhanced and the handling of the interlayer film is facilitated.

Each of the contents of the hydroxyl group of the polyvinyl acetal resin (2) and the polyvinyl acetal resin (3) is preferably 25% by mole or more, more preferably 28% by mole or more, more preferably 30% by mole or more, still more preferably 31.5% by mole or more, further preferably 32% by mole or more, especially preferably 33% by mole or more. Each of the contents of the hydroxyl group of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive strength of the interlayer film is further enhanced. Moreover, when the content of the hydroxyl group is the above upper limit or less, the flexibility of the interlayer film is enhanced and the handling of the interlayer film is facilitated.

From the viewpoint of further enhancing the sound insulating properties, it is preferred that the content of the hydroxyl group of the polyvinyl acetal resin (1) be lower than the content of the hydroxyl group of the polyvinyl acetal resin (2). From the viewpoint of further enhancing the sound insulating properties, it is preferred that the content of the hydroxyl group of the polyvinyl acetal resin (1) be lower than the content of the hydroxyl group of the polyvinyl acetal resin (3). From the viewpoint of still further enhancing the sound insulating properties, the absolute value of difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, most preferably 12% by mole or more. From the viewpoint of still further enhancing the sound insulating properties, the absolute value of difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, most preferably 12% by mole or more. The absolute value of difference between the content of the hydroxyl group of the polyvinyl acetal resin (1) and the content of the hydroxyl group of the polyvinyl acetal resin (2) and the absolute value of difference between the content of the hydroxyl group of the polyvinyl acetal resin (1) and the content of the hydroxyl group of the polyvinyl acetal resin (3) are preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1%, by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more and more preferably 0.5% by mole or more and is preferably 10% by mole or less and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more and more preferably 63% by mole or more and is preferably 85% by mole or less, more preferably 75% by mole or less, further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more and more preferably 60% by mole or more and is preferably 75% by mole or less and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The value represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

In 100% by weight of the thermoplastic resin contained in the interlayer film, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. It is preferred that the main ingredient (50% by weight or more) of the thermoplastic resin of the interlayer film be a polyvinyl acetal resin.

(Plasticizer)

From the viewpoint of further enhancing the adhesive strength of an interlayer film, it is preferred that the interlayer film contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). When the thermoplastic resin contained in the interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, and organic phosphate plasticizers such as an organic phosphate plasticizer and an organic phosphite plasticizer, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, and a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

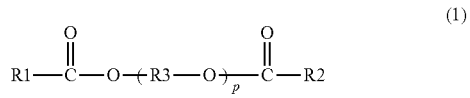

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

In the interlayer film, the content of the plasticizer (0) per 100 parts by weight of the thermoplastic resin (0) is referred to as content (0). The content (0) is preferably 25 parts by weight or more, more preferably 30 parts by weight or more, and is preferably 100 parts by weight or less, more preferably 60 parts by weight or less, further preferably 50 parts by weight or less. When the content (0) is the above lower limit or more, the penetration resistance of laminated glass is further enhanced. When the content (0) is the above upper limit or less, the transparency of the interlayer film is further enhanced.

In the first layer, the content of the plasticizer (1) per 100 parts by weight of the thermoplastic resin (1) is referred to as content (1). The content (1) is preferably 50 parts by weight or more, more preferably 55 parts by weight or more, further preferably 60 parts by weight or more, and is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

In the second layer, the content of the plasticizer (2) relative to 100 parts by weight of the thermoplastic resin (2) is referred to as a content (2). In the third layer, the content of the plasticizer (3) relative to 100 parts by weight of the thermoplastic resin (3) is referred to as a content (3). Each of the content (2) and the content (3) is preferably 10 parts by weight or more, more preferably 15 parts by weight or more, further preferably 20 parts by weight or more, especially preferably 24 parts by weight or more, and is preferably 40 parts by weight or less, more preferably 35 parts by weight or less, further preferably 32 parts by weight or less, especially preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

For the purpose of enhancing the sound insulating properties of laminated glass, it is preferred that the content (1) be larger than the content (2) and it is preferred that the content (1) be larger than the content (3).

From the viewpoint of further enhancing the sound insulating property of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

(Heat Shielding Substance)

It is preferred that the interlayer film contain a heat shielding substance. It is preferred that the first layer contain a heat shielding substance. It is preferred that the second layer contain a heat shielding substance. It is preferred that the third layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles.

Ingredient X:

It is preferred that the interlayer film contain at least one kind of Ingredient X among a phthalocyanine compound, a naphthalocyanine compound, and an anthracyanine compound. It is preferred that the first layer contain the Ingredient X. It is preferred that the second layer contain the Ingredient X. It is preferred that the third layer contain the Ingredient X. The Ingredient X is a heat shielding substance. One kind of the Ingredient X may be used alone and two or more kinds thereof may be used in combination.

The Ingredient X is not particularly limited. Examples of the Ingredient X that can be used include a phthalocyanine compound, a naphthalocyanine compound and an anthracyanine compound that are conventionally known.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

From the viewpoint of further enhancing the heat shielding properties of the interlayer film and the laminated glass, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. From the viewpoint of still further enhancing the heat shielding properties of the interlayer film and the laminated glass, it is preferred that the Ingredient X have a structural unit in which an oxygen atom is bonded to a vanadium atom.

In 100% by weight of the interlayer film or in 100% by weight of a layer containing the Ingredient X (a first layer, a second layer, or a third layer), the content of the Ingredient X is preferably 0.001% by weight or more, more preferably 0.005% by weight or more, further preferably 0.01% by weight or more, especially preferably 0.02, by weight or more. In 100% by weight of the interlayer film or in 100% by weight of a layer containing the Ingredient X (a first layer, a second layer, or a third layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding property of the laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, further preferred are ATO particles, ITO particles or tungsten oxide particles, and especially preferred are ITO particles or tungsten oxide particles. When the heat shielding particles contain ITO particles or tungsten oxide particles, the heat shielding particles may contain ITO particles and tungsten oxide particles. In particular, since the heat ray shielding function is high and the particles are readily available, preferred are tin-doped indium oxide particles (ITO particles), and also preferred are tungsten oxide particles.

From the viewpoint of further enhancing the heat shielding properties of the interlayer film and the laminated glass, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

From the viewpoint of further enhancing the heat shielding properties of the interlayer film and the laminated glass, cesium-doped tungsten oxide particles are especially preferred. From the viewpoint of still further enhancing the heat shielding properties of the interlayer film and the laminated glass, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less and more preferably 0.05 μm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, or a third layer), the content of the heat shielding particles is preferably 0.01% by weight or more, more preferably 0.1% by weight or more, further preferably 1% by weight or more, especially preferably 1.5% by weight or more. In 100% by weight of the interlayer film, or in 100% by weight of a layer containing the heat shielding particles (a first layer, a second layer, or a third layer), the content of the heat shielding particles is preferably 6% by weight or less, more preferably 5.5%, by weight or less, further preferably 4% by weight or less, especially preferably 3.5% by weight or less, most preferably 3% by weight or less. When the content of the heat shielding particles is the above lower limit or more and the above upper limit or less, the heat shielding property is sufficiently enhanced and the visible light transmittance is sufficiently enhanced.

(Metal Salt)

It is preferred that the interlayer film include at least one kind of metal salt (hereinafter, sometimes described as Metal salt M) of alkali metal salts and alkali earth metal salts. It is preferred that the first layer contain the Metal salt M. It is preferred that the second layer contain the Metal salt M. It is preferred that the third layer contain the Metal salt M. The alkali earth metal means six metals of Be, Mg, Ca, Sr, Ba, and Ra. By the use of the Metal salt M, controlling the adhesivity between the interlayer film and a lamination glass member such as a glass plate or the adhesivity between respective layers in the interlayer film is facilitated. One kind of the metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt contained in the interlayer film contain at least one kind of metal between K and Mg.

Moreover, it is more preferred that the Metal salt M be an alkali metal salt of an organic acid with 2 to 16 carbon atoms or an alkaline earth metal salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a first layer, a second layer, or a third layer) is preferably 5 ppm or more, more preferably 10 ppm or more, and further preferably 20 ppm or more and is preferably 300 ppm or less, more preferably 250 ppm or less, and further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet Ray Screening Agent)

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet absorber. It is preferred that the ultraviolet ray screening agent be an ultraviolet absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), and an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, and particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface may be coated. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxalanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 100% by weight of a layer containing the ultraviolet ray screening agent (a first layer, a second layer, or a third layer), the content of the ultraviolet ray screening agent is preferably 0.1% by weight or more, more preferably 0.2% by weight or more, further preferably 0.3% by weight or more, and especially preferably 0.5% by weight or more. In 100% by weight of the interlayer film or in 100% by weight of a layer containing the ultraviolet ray screening agent (a first layer, a second layer, or a third layer), the content of the ultraviolet ray screening agent is preferably 2.5% by weight or less, more preferably 2% by weight or less, further preferably 1% by weight or less, and especially preferably 0.8% by weight or less. When the content of the ultraviolet ray screening agent is the above-described lower limit or more and the above-described upper limit or less, deterioration in visible light transmittance after a lapse of a period can be further suppressed. In particular, by setting the content of the ultraviolet ray screening agent to be 0.2% s by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, and 2,2'-methylenebis(4,6-di-t-butyl-1-phenyloxy) (2-ethylhexyloxy) phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., and "IRGANOX 1010" available from BASF Japan Ltd., and the like.

For maintaining high visible light transmittance of the interlayer film and the laminated glass over a long period of time, it is preferred that the content of the oxidation inhibitor be 0.1% by weight or more in 100% by weight of the interlayer film or in 100% by weight of a layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the interlayer film, the first layer, the second layer, and the third layer may contain additives such as a coupling agent, a dispersing agent, a surfactant, a flame retardant, an antistatic agent, a pigment, a dye, an adhesive strength regulator other than metal salt, a moisture-resistance agent, a fluorescent brightening agent, and an infrared ray absorber, as necessary. One kind of these additives may be used alone, and two or more kinds thereof may be used in combination.

(Laminated Glass)

FIG. 5 is a sectional view showing one example of a laminated glass prepared with the interlayer film for laminated glass shown in FIG. 1.

A laminated glass 21 shown in FIG. 5 includes the interlayer film 11, a first lamination glass member 22, and a second lamination glass member 23. The interlayer film 11 is arranged between the first lamination glass member 22 and the second lamination glass member 23 to be sandwiched therebetween. The first lamination glass member 22 is arranged on a first surface of the interlayer film 11. The second lamination glass member 23 is arranged on a second surface opposite to the first surface of the interlayer film 11.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET (polyethylene terephthalate) film and the interlayer film include at least one glass plate as the first lamination glass member or the second lamination glass member. It is especially preferred that both of the first lamination glass member and the second lamination glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

Although respective thicknesses of the first lamination glass member and the second lamination glass member are not particularly limited, the thickness is preferably 1 mm or more and preferably 5 mm or less. When the lamination glass member is a glass plate, the thickness of the glass plate is preferably 1 mm or more and is preferably 5 mm or less. When the lamination glass member is a PET film, the thickness of the PET film is preferably 0.03 mm or more and is preferably 0.5 mm or less.

The method for producing the laminated glass is not particularly limited. For example, the interlayer film is sandwiched between the first lamination glass member and the second lamination glass member, and they are passed through a pressing roll, or put into a rubber bag and aspirated under reduced pressure. This removes the air remaining between the first lamination glass member and the interlayer film and between the second lamination glass member and the interlayer film. Afterward, the members are preliminarily bonded together at about 70° C. to 110° C. to obtain a laminate. Next, by putting the laminate into an autoclave or by pressing the laminate, the members are press-bonded together at about 120° C. to 150° C. and under a pressure of 1 MPa to 1.5 MPa. In this way, laminated glass can be obtained.

The laminated glass can be used for automobiles, railway vehicles, aircraft, ships, buildings, and the like. It is preferred that the laminated glass be laminated glass for buildings or for vehicles and it is more preferred that the laminated glass be laminated glass for vehicles. The laminated glass can also be used for applications other than these applications. The laminated glass can be used for a windshield, side glass, rear glass, or roof glass of an automobile, and the like. Since the laminated glass is high in heat shielding properties and is high in visible light transmittance, the laminated glass is suitably used for automobiles.

It is preferred that the laminated glass be a laminated glass serving as a head-up display (HUD). In the laminated glass serving as a HUD, measured information such as the speed which is sent from a control unit and the like can be projected onto the windshield from a display unit of the instrumental panel. Accordingly, without making a driver of an automobile move his or her visual field downward, a front visual field and measured information can be visually recognized simultaneously.

A head-up display system can be obtained by using the aforementioned head-up display. The head-up display system includes the laminated glass, and a light source device for irradiating the laminated glass with light for image display. The light source device can be attached, for example, to a dashboard in a vehicle. By irradiating the display region of the laminated glass with light from the light source device, it is possible to achieve image display.

Hereinafter, the present invention will be described in more detail with reference to examples and comparative examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

The following materials were prepared.

Example 1

Preparation of Composition for Forming Interlayer Film (First Layer):

The following ingredients were mixed, and kneaded sufficiently with a mixing roll to obtain a composition for forming an interlayer film.

Polyvinyl acetal resin (average polymerization degree: 1700, content of hydroxyl group: 30.5% by mole, acetylation degree: 1.0% by mole, acetalization degree: 68.5% by mole): 100 parts by weight Triethylene glycol di-2-ethylhexanoate (3GO): 40 parts by weight An amount that is to be 0.2% by weight in the obtained interlayer film of Tinuvin 326 (2-(2'-hydroxy-3'-t-butyl-5-methylphenyl)-5-chlorobenzotriazole, "Tinuvin 326" available from BASE Japan Ltd.)

An amount that is to be 0.2% by weight in the obtained interlayer film of BHT (2,6-di-t-butyl-p-cresol)

Preparation of Interlayer Film:

The composition for forming an interlayer film was extruded with an extruder, and the interlayer film was wound to obtain a roll body. In this manner, a wedge-like shaped interlayer film having only the first layer was prepared.

The obtained interlayer film has a minimum thickness at one end and has a maximum thickness at the other end. A distance U between one end and the other end was 1200 mm.

In Example 1, an interlayer film having a portion where the increment of the thickness decreases from one end side to the other end side in a region where the thickness increases, and having a portion where the wedge angle decreases from one end side to the other end side in a region where the sectional shape in the thickness direction is a wedge-like shape was prepared (see FIG. 2 for the contour shape). The wedge angle of the interlayer film as a whole was 0.40 mrad.

Example 2

Preparation of Composition for Forming First Layer:

The following ingredients were mixed, and kneaded sufficiently with a mixing roll to obtain a composition for forming a first layer.

Polyvinyl acetal resin (average polymerization degree: 3000, content of hydroxyl group: 22% by mole, acetylation degree: 13% by mole, acetalization degree: 65% by mole): 100 parts by weight Triethylene glycol di-2-ethylhexanoate (3GO): 60 parts by weight An amount that is to be 0.2% by weight in the obtained first layer of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained first layer of BHT (2,6-di-t-butyl-p-cresol)

Preparation of Composition for Forming Second Layer and Third Layer:

The following ingredients were mixed, and kneaded sufficiently with a mixing roll to obtain a composition for forming a second layer and a third layer.

Polyvinyl acetal resin (average polymerization degree: 1700, content of hydroxyl group: 30.5% by mole, acetylation degree: 1% by mole, acetalization degree: 68.5% by mole): 100 parts by weight Triethylene glycol di-2-ethylhexanoate (3GO): 38 parts by weight An amount that is to be 0.2% by weight in the obtained second layer and third layer of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained second layer and third layer of BHT (2,6-di-t-butyl-p-cresol)

Preparation of Interlayer Film:

The composition for forming a first layer, and the composition for forming a second layer and a third layer were coextruded by using a co-extruder, and the interlayer film was wound to obtain a roll body. In this manner, a wedge-like shaped interlayer film having a multi-layer structure of the second layer/the first layer/the third layer was prepared.

The obtained interlayer film has a minimum thickness at one end and has a maximum thickness at the other end. A distance U between one end and the other end was 1000 mm.

In Example 2, an interlayer film having a portion where the increment of the thickness decreases from one end side to the other end side in a region where the thickness increases, and having a portion where the wedge angle decreases from one end side to the other end side in a region where the sectional shape in the thickness direction is a wedge-like shape was prepared (see FIG. 1 for the contour shape). The wedge angle of the interlayer film as a whole was 0.44 mrad.

Example 3

A wedge-like shaped interlayer film having a structure consisting only of the first layer was prepared in the same manner as that in Example 1 except that the die outlet shape was adjusted.

The obtained interlayer film has a minimum thickness at one end and has a maximum thickness at the other end. A distance U between one end and the other end was 1120 mm.

In Example 3, an interlayer film having a portion where the increment of the thickness decreases from one end side to the other end side in a region where the thickness increases, and having a portion where the wedge angle decreases from one end side to the other end side in a region where the sectional shape in the thickness direction is a wedge-like shape was prepared (see FIG. 2 for the contour shape). The wedge angle of the interlayer film as a whole was 0.41 mrad.

Example 4

A wedge-like shaped interlayer film having a multilayer structure of the second layer/the first layer/the third layer was prepared in the same manner as that in Example 2 except that the die outlet shape was adjusted, and the degree of kneading in the melting section of the extruder was changed.

The obtained interlayer film has a minimum thickness at one end and has a maximum thickness at the other end. A distance U between one end and the other end was 1100 mm.

In Example 4, an interlayer film having a portion where the increment of the thickness decreases from one end side to the other end side in a region where the thickness increases, and having a portion where the wedge angle decreases from one end side to the other end side in a region where the sectional shape in the thickness direction is a wedge-like shape was prepared (see FIG. 1 for the contour shape). The wedge angle of the interlayer film as a whole was 0.70 mrad.

Comparative Example 1

A wedge-like shaped interlayer film having a structure consisting only of the first layer was prepared in the same manner as that in Example 1 except that the die outlet shape was changed.

The obtained interlayer film has a minimum thickness at one end and has a maximum thickness at the other end. A distance U between one end and the other end was 1110 mm.

In Comparative Example 1, an interlayer film having a portion where the increment of the thickness decreases from one end side to the other end side in a region where the thickness increases, and having a portion where the wedge angle decreases from one end side to the other end side in a region where the sectional shape in the thickness direction is a wedge-like shape was prepared (see FIG. 2 for the contour shape). The wedge angle of the interlayer film as a whole was 0.44 mrad.

Comparative Example 2

A wedge-like shaped interlayer film having a multilayer structure of the second layer/the first layer/the third layer was prepared in the same manner as that in Example 2 except that the die outlet shape was adjusted, and the degree of kneading of the resin composition in the melting section of the extruder was changed.

The obtained interlayer film has a minimum thickness at one end and has a maximum thickness at the other end. A distance U between one end and the other end was 1215 mm.

In Comparative Example 2, an interlayer film having a portion where the increment of the thickness decreases from one end side to the other end side in a region where the thickness increases, and having a portion where the wedge angle decreases from one end side to the other end side in a region where the sectional shape in the thickness direction is a wedge-like shape was prepared (see FIG. 2 for the contour shape). The wedge angle of the interlayer film as a whole was 0.83 mrad.

Comparative Example 3

A wedge-like shaped interlayer film having a structure consisting only of the first layer was prepared in the same manner as that in Example 1 except that the die outlet shape was adjusted.

The obtained interlayer film has a minimum thickness at one end and has a maximum thickness at the other end. A distance U between one end and the other end was 1000 mm.

In Comparative Example 3, an interlayer film having a portion where the increment of the thickness decreases from one end side to the other end side in a region where the thickness increases, and having a portion where the wedge angle decreases from one end side to the other end side in a region where the sectional shape in the thickness direction is a wedge-like shape was prepared (see FIG. 2 for the contour shape). The wedge angle of the interlayer film as a whole was 0.51 mrad.

Comparative Example 4

A wedge-like shaped interlayer film having a multilayer structure of the second layer/the first layer/the third layer was prepared in the same manner as that in Example 2 except that the temperature of the resin composition at the extruder outlet was changed.

The obtained interlayer film has a minimum thickness at one end and has a maximum thickness at the other end. A distance U between one end and the other end was 988 mm.

In Comparative Example 4, an interlayer film having a portion where the increment of the thickness decreases from one end side to the other end side in a region where the thickness increases, and having a portion where the wedge angle decreases from one end side to the other end side in a region where the sectional shape in the thickness direction is a wedge-like shape was prepared (see FIG. 1 for the contour shape). The wedge angle of the interlayer film as a whole was 0.62 mrad.

Comparative Example 5

A wedge-like shaped interlayer film having a structure consisting only of the first layer was prepared in the same manner as that in Example 1 except that the die outlet shape was adjusted, and the degree of kneading of the resin composition in the melting section of the extruder was changed.

The obtained interlayer film has a minimum thickness at one end and has a maximum thickness at the other end. A distance U between one end and the other end was 1000 mm.

In Comparative Example 5, an interlayer film having a portion where the increment of the thickness decreases from one end side to the other end side in a region where the thickness increases, and having a portion where the wedge angle decreases from one end side to the other end side in a region where the sectional shape in the thickness direction is a wedge-like shape was prepared (see FIG. 2 for the contour shape). The wedge angle of the interlayer film as a whole was 0.71 mrad.

(Evaluation)
(1) Inclination of Approximate Line and Maximum Value of Absolute Values of Deviation in Partial Wedge Angle In each section A, a formula of approximate line A was determined and deviation in partial wedge angle was calculated, and an inclination of approximate line A and a maximum value of absolute values of deviation in partial wedge angle were calculated. In Example 4 and Comparative Example 5, a formula of approximate line B was determined and deviation in partial wedge angle was calculated, and also an inclination of approximate line B and a maximum value of absolute values of deviation in partial wedge angle were calculated. In Tables 1, 2, an inclination of approximate line and a maximum value of absolute values of deviation in partial wedge angle in a specific section A are shown. In the interlayer films obtained in Comparative Examples 1 to 5, there was no section A that satisfies the configuration "the inclination of approximate line is −0.05 mrad/m or less, and the maximum value of absolute values of deviation in partial wedge angle is 0.2 mrad or less".

(2) Reflected Double Images in HUD Region

A pair of glass plates (clear glass, the size of 510 mm×1100 mm, 2.0 mm in thickness) was prepared. An interlayer film with a size corresponding to the size of the glass plate was sandwiched between the pair of glass plates to obtain a laminate. As shown in FIG. 8, the obtained laminate was fitted into a frame of an EPDM-made rubber tube (frame member). The rubber tube has a width of 15 mm. Next, the laminate fitted into a frame of an EPDM-made rubber tube was preliminarily press-bonded by a vacuum bag method. The preliminarily press-bonded laminate was subjected to press-bonding at 150° C. and a pressure of 1.2 MPa with the use of an autoclave to obtain a sheet of laminated glass.

The obtained laminated glass was installed at a position of the windshield. The information to be displayed, which is emitted from a display unit (focal distance: 2 m, 3 m, and 4 m) installed below the laminated glass, was caused to be reflected by the laminated glass, and the presence or absence of double images at a prescribed position (the entire region for display) was visually confirmed. The double images in the HUD region were judged according to the following criteria.

[Criterial for Judgement in Reflected Double Images in HUD Region]

◯◯: Double images are not confirmed

◯: Reflected double images are confirmed very slightly, but are at a level causing no problem in practical use ×: Not corresponding to the criteria of ◯◯ and ◯

(3) Transmitted Double Images (2) Measurement of transmitted double images was conducted on the basis of the double image test according to JIS R3212 using a laminated glass obtained in reflected double images in HUD region.

[Criteria for Judgment in Transmitted Double Images]

◯: Maximum value of separation between primary image and secondary image is not more than 25 minutes ×: Maximum value of separation between primary image and secondary image is more than 25 minutes (4) Region Having a Ten-Point Average Roughness within ±30% of an Average Value of Ten-Point Average Roughness of the Entire Embossed Outer Surface A ten-point average roughness of the outer surface of the interlayer film was measured in accordance with JIS B0601: 1994. As a measuring device, "Surfcorder SE300" available from Kosaka Laboratory Ltd. was used. Also, using a stylus having a tip radius of 2 μm and a tip angle of 60°, measurement was conducted in measurement conditions of a cutoff value at the time of measurement of 2.5 mm, a standard length 2.5 mm, a measurement length of 12.5 mm, a spare length 2.5 mm, and a feed speed of stylus of 0.5 mm/second in an environment of 23° C. and 30 RH %. A ten-point average roughness of the outer surface of the interlayer film was measured by the following method. Measuring points are set at 5-mm intervals from the one end toward the other end of the interlayer film. At each measuring point, the measuring device is rotated every 45 degrees and the ten-point average roughness is measured eight times in total, and the maximum value of the measurements is determined as a ten-point average roughness at each measuring point. From the ten-point average roughness of each measuring point, an average value of ten-point average roughness of the entire outer surface of the interlayer film was determined, and a region (%) of the outer surface of the interlayer film having a ten-point average roughness within ±30% of the average value of ten-point average roughness of the entire embossed outer surface was determined.

(5) Heat Shrinkage Rate

The obtained interlayer film was cut out from the one end to the other end in the TD direction to have a dimension of 10 cm in the MD direction. After cutting, moisture conditioning at a temperature of 20° C. and a humidity of 30% RH was conducted for two days. Then, as shown in FIG. 7, test pieces were cut out at a first position of 0.05 U from the one end toward the other end, a second position of 0.5 U from one end toward the other end, and a third position of 0.95 U from the one end toward the other end. The test piece has a square shape of 5 cm in the MD direction and 5 cm in the TD direction. The test pieces were cut out in the center of the MD direction of the test pieces. The test pieces were cut out such that the first position, the second position and the third position were centered.

The obtained test pieces were placed horizontally on a fluorine resin sheet, and left to stand at 150° C. for 0.5 hours. The dimension in the MD direction was measured before and after leaving to stand, and a heat shrinkage rate was determined according to the following formula. Among the obtained three heat shrinkage rates, an absolute value of difference between the maximum heat shrinkage rate and the minimum heat shrinkage rate was determined.

Heat shrinkage rate (%)=((Dimension in *MD* direction before heating−dimension in *MD* direction after heating)/dimension in *MD* direction before heating)×100

The details and the results are shown in the following Tables 1, 2.

TABLE 1

|  | Example 1 | | | Example 2 | | | Example 3 | | | Example 4 | | |
| --- | --- | --- | --- | --- | --- | --- | --- | --- | --- | --- | --- | --- |
| Distance between one end and other end (mm) | 1200 | | | 1000 | | | 1120 | | | 1100 | | |
| Maximum thickness (μm) | 1240 | | | 1200 | | | 1260 | | | 1525 | | |
| Wedge angle of interlayer film as a whole (mrad) | 0.40 | | | 0.44 | | | 0.41 | | | 0.70 | | |
| Section A or B (distance from one end of interlayer film) (mm) | 500-800 | 200-500 | 700-1000 | 200-500 | 600-900 | 250-550 | 600-900 | 125-425 | 500-800 | 700-1000 | 50-1050 | |
| Inclination of approximate line A or B (mrad/m) | −0.06 | −0.10 | −0.15 | −0.10 | −0.25 | −0.05 | −0.80 | −0.20 | −0.12 | −0.10 | −0.15 | |
| Maximum value of absolute values of deviation in partial wedge angle (mrad) | 0.12 | 0.10 | 0.17 | 0.10 | 0 | 0.03 | 0.19 | 0.14 | 0.15 | 0.18 | 0.11 | |
| Reflected double images in HUD region | ◯ | ◯ | — | ◯ | — | ◯ | — | ◯ | ◯ | — | ◯ | |

TABLE 1-continued

|  | Example 1 | | | Example 2 | | | Example 3 | | | Example 4 | | |
|---|---|---|---|---|---|---|---|---|---|---|---|---|
| Transmitted double images | ○ | ○ | ○ | ○ | ○ | ○ | ○ | ○ | ○ | ○ | ○ | ○ |
| Region having ten-point average roughness within ±30% of average value of ten-point average roughness of entire embossed outer surface (%) | | 60 | | | 67 | | | 55 | | | 60 | |
| Absolute value of difference between maximum heat shrinkage rate and minimum heat shrinkage rate (%) | | 3 | | | 2 | | | 3 | | | 3 | |

TABLE 2

|  | Comparative Example 1 | Comparative Example 2 | Comparative Example 3 | Comparative Example 4 | Comparative Example 5 | |
|---|---|---|---|---|---|---|
| Distance between one end and other end (mm) | 1110 | 1215 | 1009 | 1000 | 1000 | |
| Maximum thickness (μm) | 1240 | 1772 | 1273 | 1374 | 1475 | |
| Wedge angle of interlayer film as a whole (mrad) | 0.44 | 0.83 | 0.51 | 0.62 | 0.71 | |
| Section A or B (distance from one end of interlayer film) (mm) | 500-800 | 200-500 | 250-550 | 650-950 | 400-700 | 50-950 |
| Inclination of approximate line A or B (mrad/m) | −0.01 | 0 | −0.07 | −0.20 | −0.05 | −0.06 |
| Maximum value of absolute values of deviation in partial wedge angle (mrad) | 0.28 | 0.11 | 0.29 | 0.39 | 0.29 | 0.35 |
| Reflected double images in HUD region | X | ○ | X | — | X | X |
| Transmitted double images | X | X | X | X | X | X |
| Region having ten-point average roughness within ±30% of average value of ten-point average roughness of entire embossed outer surface (%) | 91 | 92 | 45 | 33 | 56 | |
| Absolute value of difference between maximum heat shrinkage rate and minimum heat shrinkage rate (%) | 3 | 4.6 | 3.5 | 3.5 | 4.3 | |

EXPLANATION OF SYMBOLS

1, 1A, 1B, 1C: First layer
1Aa: Portion having a rectangular sectional shape in thickness direction
1Ab: Portion having a wedge-like sectional shape in thickness direction
2, 2B: Second layer
3, 3B: Third layer
11, 11A, 11B, 11C: Interlayer film
11a: One end
11b: Other end
11Aa: Portion having a rectangular sectional shape in thickness direction
11Ab: Portion having a wedge-like sectional shape in thickness direction
21: Laminated glass
22: First lamination glass member
23: Second lamination glass member
R1: Region for display
R2: Surrounding region
R3: Shading region
51: Roll body
61: Winding core

The invention claimed is:

1. An interlayer film for laminated glass,
the interlayer film having one end and the other end being at an opposite side of the one end,
the other end having a thickness larger than a thickness of the one end,
provided that an inclination of approximate line A and a maximum value of absolute values of deviation in partial wedge angle are calculated according to a determination of a formula of approximate line A and a calculation of the deviation in partial wedge angle, wherein the inclination of approximate line A is −0.05 mrad/m or less in at least one section A, and the maximum value of absolute values of deviation in partial wedge angle is 0.2 mrad or less,
wherein the formula of approximate line A is determined and the deviation in partial wedge angle is calculated in an order of steps 1 to 4:
the step 1 of referring to a position of 40 mm from the one end toward the other end of the interlayer film as a start point X, and a position of 40 mm from the other end toward the one end of the interlayer film as an end point X, and selecting points A at 1-mm intervals from the start point X toward the end point X,
the step 2 of calculating a partial wedge angle A in each partial region A of 80 mm centered at each of the points A in a direction connecting the one end and the other end to obtain "partial wedge angle A at each point A",
the step 3 of referring to a position of 190 mm from the one end toward the other end of the interlayer film as a start point Y, and a position of 190 mm from the other end toward the one end of the interlayer film as an end point Y, and setting sections A of 300 mm at 1-mm intervals from the start point Y toward the end point Y such that the center of each section A is positioned between the start point Y and the end point Y, and the step 4 of determining the formula of approximate line A, and the deviation in partial wedge angle:

the formula of approximate line A: in each section A, preparing an approximate line by plotting "distance from the one end of the interlayer film" on the x-axis, and "partial wedge angle A" on the y-axis from "partial wedge angle A at each point A" where the point A exists in the section A, and determining a formula of approximate line A in section A; and the deviation in partial wedge angle: from the formula of approximate line A, calculating partial wedge angle A' at each point A to obtain "partial wedge angle A' at each point A on approximate line A", and—in each section A, from "partial wedge angle A at each point A" where the point A exists in the section A and "partial wedge angle A' at each point A on approximate line A", determining deviation in partial wedge angle in each section A.

2. The interlayer film for laminated glass according to claim 1, wherein in at least one section A contained between a position of 100 mm from the one end toward the other end of the interlayer film, and a position of 600 mm from the one end toward the other end of the interlayer film, the inclination of approximate line A is −0.05 mrad/m or less, and the maximum value of absolute values of deviation in partial wedge angle is 0.2 mrad or less.

3. The interlayer film for laminated glass according to claim 1, wherein in at least one section A contained between a position of 600 mm from the one end toward the other end of the interlayer film, and the other end of the interlayer film, the inclination of approximate line A is −0.05 mrad/m or less, and the maximum value of absolute values of deviation in partial wedge angle is 0.2 mrad or less.

4. The interlayer film for laminated glass according to claim 1, provided that an inclination of approximate line B and a maximum value of absolute values of deviation in partial wedge angle are calculated according to a determination of a formula of approximate line B and a calculation of the deviation in partial wedge angle, wherein the inclination of approximate line B is −0.05 mrad/m or less, and the maximum value of absolute values of deviation in partial wedge angle is 0.2 mrad or less in section B, wherein the formula of approximate line B is determined and the deviation in partial wedge angle is calculated in an order of steps 5 and 6:

the step 5 of setting a section between a position of 50 mm from the one end toward the other end of the interlayer film, and a position of 50 mm from the other end toward the one end of the interlayer film as section B; and the step 6 of determining the formula of approximate line B, and the deviation in partial wedge angle:

the formula of approximate line B: in section B, preparing an approximate line B by plotting "distance from the one end of the interlayer film" on the x-axis, and "partial wedge angle A" on the y-axis from "partial wedge angle A at each point A" where the point A exists in the section B, and determining a formula of approximate line B in section B; and the deviation in partial wedge angle: from the formula of approximate line B, calculating partial wedge angle A″ at each point A to obtain "partial wedge angle A″ at each point A on approximate line B″, and in section B, from "partial wedge angle A at each point A" where the point A exists in the section B and "partial wedge angle A″ at each point A on approximate line B", determining deviation in partial wedge angle in section B.

5. The interlayer film for laminated glass according to claim 1, wherein at least one of outer surfaces of the interlayer film is embossed.

6. The interlayer film for laminated glass according to claim 5, wherein a region of 50% or more of the embossed outer surface of the interlayer film has a ten-point average roughness within ±30% of an average value of a ten-point average roughness of the entire embossed outer surface of the interlayer film.

7. The interlayer film for laminated glass according to claim 1, provided that a distance between the one end and the other end of the interlayer film is referred to as U, and among three heat shrinkage rates:

a first heat shrinkage rate at 150° C. in an MD direction at a first position of 0.05U from the one end toward the other end, a second heat shrinkage rate at 150° C. in an MD direction at a second position of 0.5U from the one end toward the other end, and a third heat shrinkage rate at 150° C. in an MD direction at a third position of 0.95U from the one end toward the other end, an absolute value of difference between a maximum heat shrinkage rate and a minimum heat shrinkage rate is 15% or less.

8. The interlayer film for laminated glass according to claim 1, wherein the interlayer film has a maximum thickness of 1700 μm or less.

9. A roll body, comprising:
a winding core; and
the interlayer film for laminated glass according to claim 1,
the interlayer film for laminated glass being wound around an outer periphery of the winding core.

10. A laminated glass comprising:
a first lamination glass member;
a second lamination glass member; and
the interlayer film for laminated glass according to claim 1,
the interlayer film for laminated glass being arranged between the first lamination glass member and the second lamination glass member.

* * * * *